(12) United States Patent
Johansen et al.

(10) Patent No.: US 7,475,801 B2
(45) Date of Patent: Jan. 13, 2009

(54) SYSTEMS FOR PROVIDING CONTROLLED POWER TO ULTRASONIC WELDING PROBES

(75) Inventors: David K. Johansen, Lake In The Hills, IL (US); Charles L. Leonard, Naperville, IL (US); Leo Klinstein, Glenview, IL (US); William E. Jurkowski, Wheaton, IL (US); Joseph Re, Lemont, IL (US)

(73) Assignee: Dukane Corporation, St. Charles, IL (US)

( * ) Notice: Subject to any disclaimer, the term of this patent is extended or adjusted under 35 U.S.C. 154(b) by 245 days.

(21) Appl. No.: 11/646,865

(22) Filed: Dec. 28, 2006

(65) Prior Publication Data

US 2007/0163349 A1 Jul. 19, 2007

Related U.S. Application Data

(60) Provisional application No. 60/754,681, filed on Dec. 29, 2005.

(51) Int. Cl.
*B23K 1/06* (2006.01)
*B29C 65/08* (2006.01)
(52) U.S. Cl. .................. 228/1.1; 228/8; 156/580.1
(58) Field of Classification Search .............. None
See application file for complete search history.

(56) References Cited

U.S. PATENT DOCUMENTS

| 3,842,340 | A | * | 10/1974 | Brandquist | 363/96 |
| 4,069,444 | A | * | 1/1978 | Heim | 318/114 |
| 4,868,445 | A | * | 9/1989 | Wand | 310/316.01 |
| 4,973,876 | A | * | 11/1990 | Roberts | 310/316.01 |
| 5,880,580 | A | | 3/1999 | Johansen | |
| 6,163,100 | A | * | 12/2000 | Morizaki et al. | 310/317 |
| 6,265,809 | B1 | * | 7/2001 | Fujii et al. | 310/317 |
| 6,462,461 | B1 | * | 10/2002 | Puskas | 310/323.01 |
| 6,827,247 | B1 | * | 12/2004 | Fan et al. | 228/1.1 |
| 6,873,529 | B2 | * | 3/2005 | Ikuta et al. | 361/719 |
| 6,961,245 | B2 | * | 11/2005 | Ikuta et al. | 361/719 |
| 2003/0169575 | A1 | * | 9/2003 | Ikuta et al. | 361/761 |
| 2004/0056344 | A1 | * | 3/2004 | Ogawa et al. | 257/686 |
| 2005/0146854 | A1 | * | 7/2005 | Ikuta et al. | 361/719 |
| 2008/0129146 | A1 | * | 6/2008 | Puskas | 310/317 |

* cited by examiner

*Primary Examiner*—Kiley Stoner
(74) *Attorney, Agent, or Firm*—Nixon Peabody LLP

(57) ABSTRACT

An ultrasonic generator comprising an input module for receiving a power signal. An output module for outputting an ultrasonic signal is also included in the generator. A motherboard is coupled to both the input module and the output module. The motherboard includes a digital controller adapted to control the input module and the output module.

15 Claims, 19 Drawing Sheets

SYSTEMS FOR PROVIDING CONTROLLED POWER TO ULTRASONIC WELDING PROBES

CROSS-REFERENCE TO RELATED APPLICATIONS

This application claims priority to U.S. Provisional Application Ser. No. 60/754,681 filed Dec. 29, 2005.

FIELD OF THE INVENTION

This invention is directed generally to ultrasonic power supplies and is more particularly related to systems and methods for providing power to resonant ultrasonic stack assemblies used for ultrasonic welding or other applications that require ultrasonic energy.

BACKGROUND OF THE INVENTION

Ultrasonic welding is an efficient technique for joining component parts in manufacturing environments. Applications of ultrasonic welding include the welding of plastic parts and fabrics when manufacturing products such as automobile components, medical products, and other industrial or consumer products.

In current ultrasonic welding devices, the ultrasonic generator includes many components for controlling and regulating the power delivered to an ultrasonic load. In many of these current ultrasonic generators, most of the designs use architectures and packaging methods that are not easily assembled and serviced, or the optional system features can not be easily upgraded in the field. Also, by utilizing conventional design methods, the power density of the packaged system is relatively low. Most of the current ultrasonic generators also use analog components, which limit the adjustable control methods that can be incorporated into the design. Also, by utilizing mostly analog components in the design, the ultrasonic generator will incorporate more circuitry, have a greater sensitivity to noise and will require a larger amount of circuit board component space.

Thus, there is a need for an ultrasonic power supply that utilizes a modular, compact architecture, allowing for ease of system assembly, simple system fault diagnostics, modular serviceability, optional features that are easily upgraded in the field, small physical size, and additional system mounting methods. There is also a need for an ultrasonic welding device that utilizes mostly digital components, allowing for greater flexibility, smaller size, and additional features.

SUMMARY OF THE INVENTION

According to one embodiment of the present invention, an ultrasonic generator is provided. The generator includes an input module for receiving a power signal, an output module for outputting an ultrasonic signal, and a motherboard coupled to both the input module and the output module. The motherboard includes a digital controller adapted to control the input module and the output module.

According to another embodiment of the present invention, a method for generating an ultrasonic signal includes providing an input module for receiving a power signal. An output module for outputting an ultrasonic signal is also provided. A motherboard is coupled to both the input module and the output module. The motherboard includes a digital controller adapted to control the input module and the output module.

According to yet another embodiment of the present invention, a method for testing the power of an ultrasonic generator includes transmitting a test signal to an input module for testing an incoming power supply. In response to a positive test result, transmitting a test signal to a plurality of buses for testing an internal power supply. In response to a positive test result from the internal power supply, a test signal is transmitted to an outputting power supply. In response to a positive test result from the outputting power supply, full operation of the ultrasonic generator is allowed.

According to another embodiment of the present invention, a method for operating an ultrasonic generator is provided. The method includes providing an input module and an output module and coupling a motherboard to the input module and the output module. A regulation control is selected, via the motherboard, such that the regulation control can be adjusted in a plurality of increments.

According to yet another embodiment of the present invention, a method of preventing overload trips in an ultrasonic generator includes sampling a power level of the ultrasonic generator. The sampled power level is compared to the sampled power level to a preset overload power level. In response to the sample power level being greater than the preset overload power level, a trip is activated once a predetermined time has elapsed. The predetermined time correlates to the sampled power level.

According to yet another embodiment of the present invention, a method of preventing an overload trip of an ultrasonic generator is provided and includes sampling a power level of the ultrasonic generator. It is then determined whether the sampled power is within a set percentage of an overload trip level. In response to the sampled power being within the set percentage of the overload trip level, an amplitude of the sampled power is decreased.

According to yet another embodiment of the present invention, a method for setting an ultrasonic resonant frequency for an ultrasonic generator is provided. The method includes measuring a resonant frequency while the ultrasonic generator is in use and setting a phase lock loop to about the resonant frequency.

According to another embodiment of the present invention, a method for safely decreasing the output amplitude of an ultrasonic generator includes activating a ramp down amplitude control algorithm in the ultrasonic generator and gradually reducing the output amplitude of the ultrasonic generator over a predetermined period of time. This method allows to extend the service life of various components of an ultrasonic stack, such as sonotrodes (horns), boosters and transducers, by reducing stresses introduced at the end of a cycle when the amplitude is turned off abruptly.

According to another embodiment of the present invention, a method for reaching a set amplitude in an ultrasonic generator is provided. The method includes storing a plurality of curves in a memory of the ultrasonic generator. Each of the curves represents a different method for reaching a set amplitude of the ultrasonic generator. One of the plurality of set curves in the memory is selected. Following the selected curve to reach the set amplitude in the ultrasonic generator.

DETAILED DESCRIPTION OF ILLUSTRATIVE EMBODIMENTS

Figure 1:
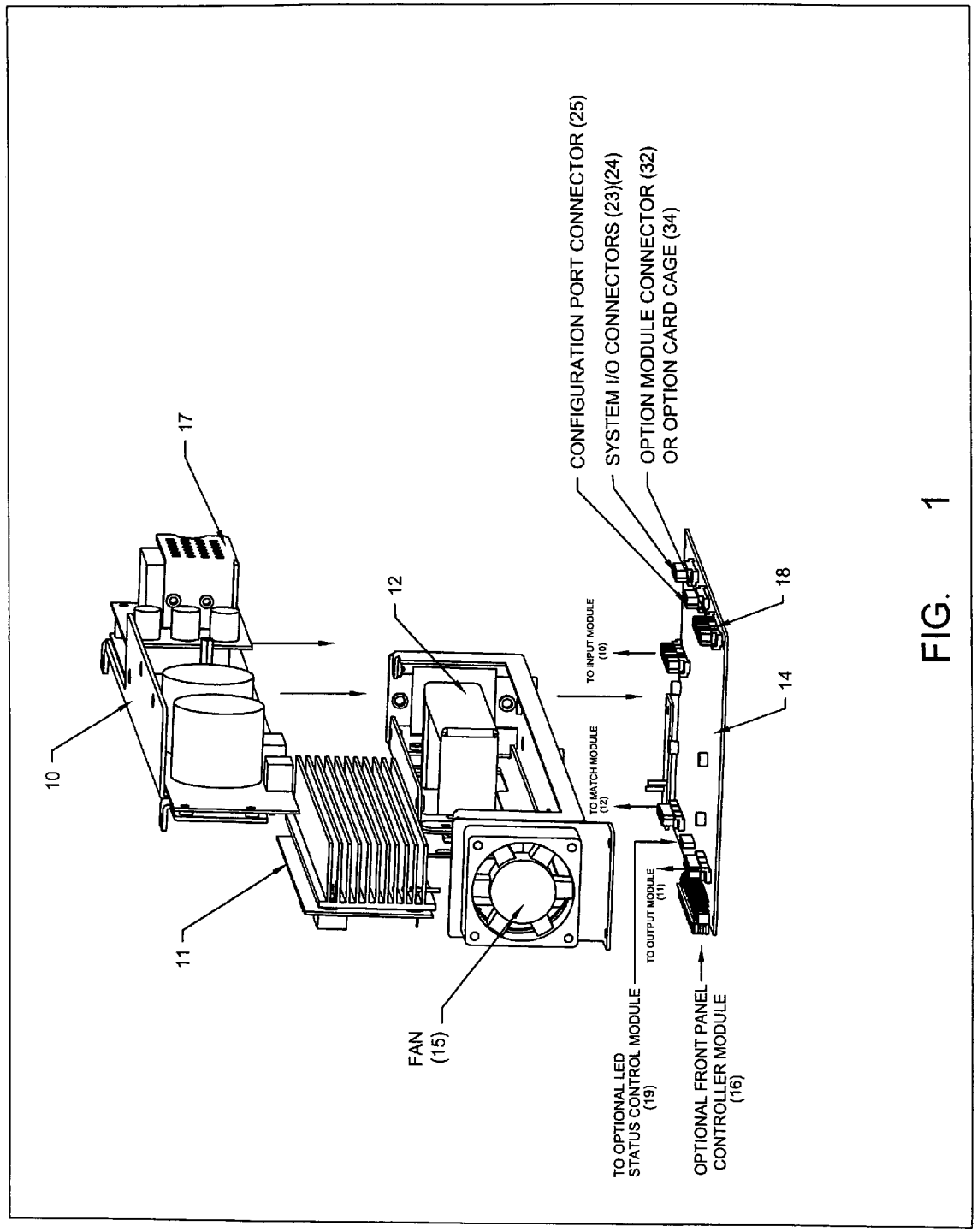
FIG. 1 is an exploded view of an ultrasonic generator illustrating the modular system architecture of a basic ultrasonic power supply according to one embodiment of the present invention.
Figure 2:
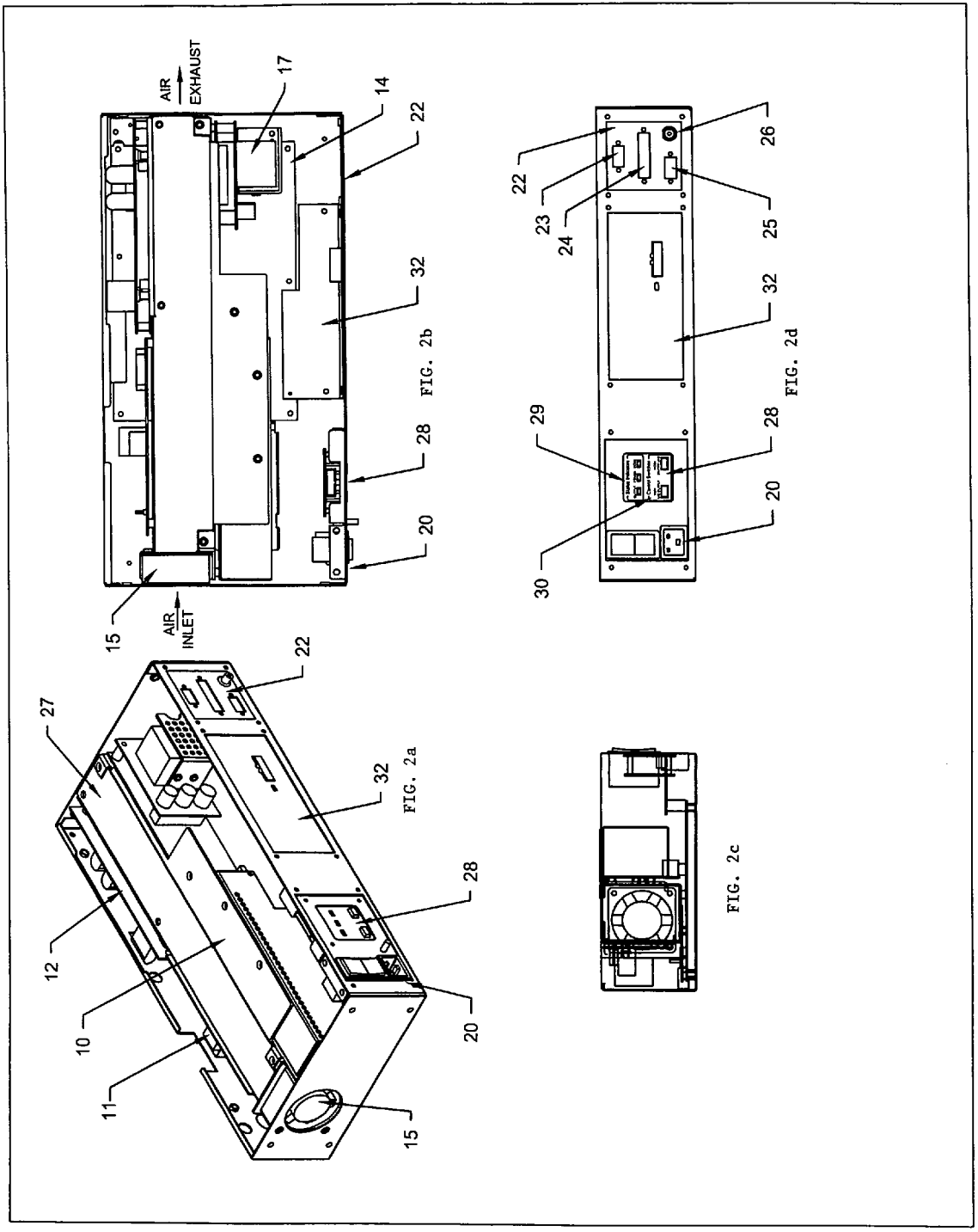
FIGS. 2a, 2b, 2c and 2d are perspective, top plan, and elevation and front elevation views, respectively, of a chassis for the modular architecture of an ultrasonic generator that is controlled manually or with an automated control system.
Figure 3:
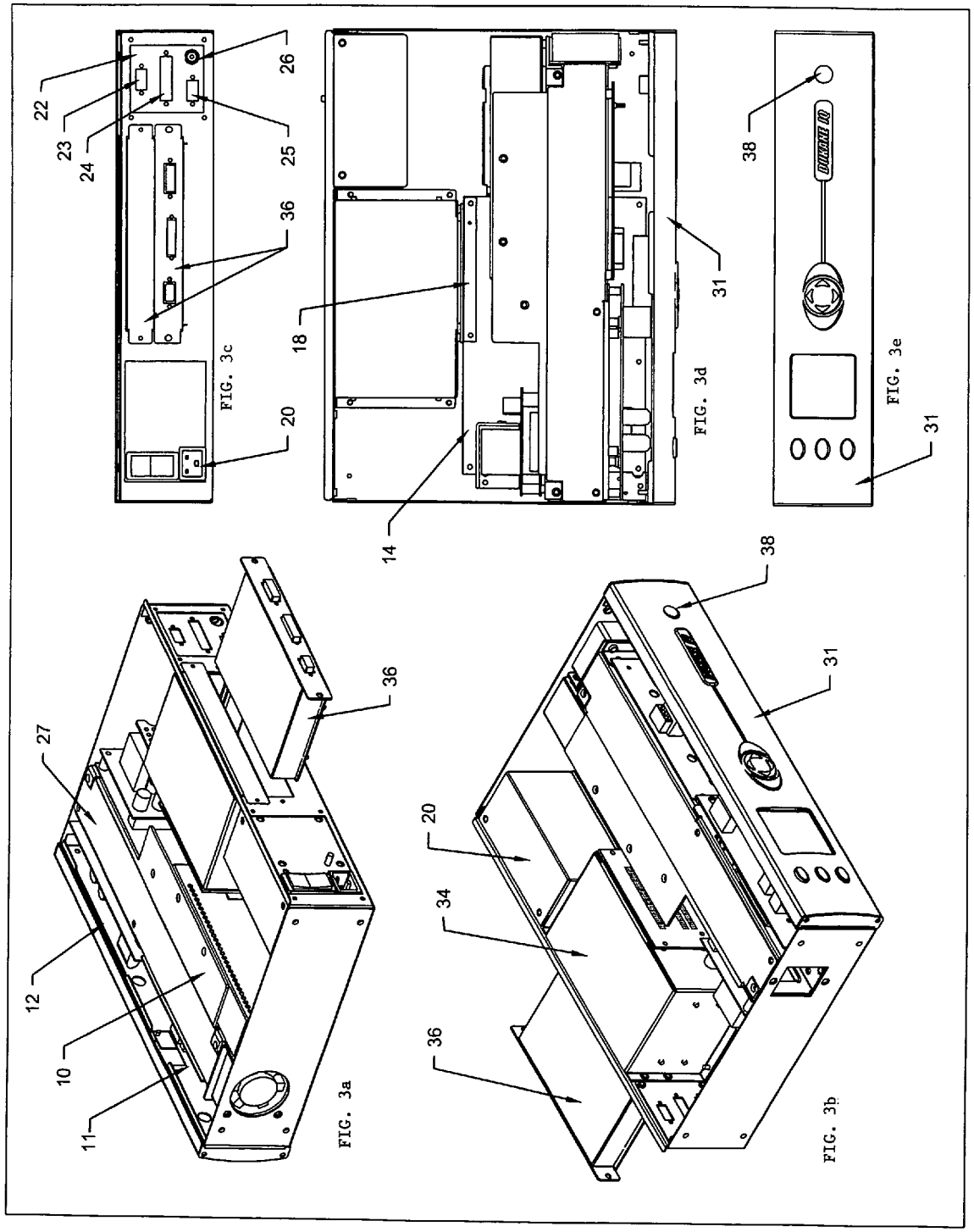
FIGS. 3a, 3b, 3c, 3d and 3e are rear perspective, front perspective, rear elevation, top plan and front elevation views, respectively, of a chassis for the modular architecture of an ultrasonic generator that includes a front panel process controller with options.

FIG. 1 illustrates the modular system architecture of a basic ultrasonic power supply in which the core system components are an Input Module 10, an Output Module 11, a Matching Module 12 and a Motherboard 14 that interconnects all of the system subassemblies together. The Output Module 11 includes a temperature sensor and thermostatic control circuitry, which cycles the operation of the cooling fan 15 as needed to cool the power conversion circuitry. The Motherboard 14 also includes connectors that support optional features such as a Front Panel Process Controller board 16, an LED Status Control board 19 and an option module connector 18 that supports either an individual option board or an option card cage that supports multiple option boards. This modular design approach allows many different system assembly variations with a wide variety of optional features, when they are needed.

FIGS. 2a, 2b, 2c and 2d illustrate a base level ultrasonic power supply with the subassemblies installed in a chassis. The core subassemblies shown in FIG. 1 are installed in the chassis and are identified using the same reference numbers used in FIG. 1. In addition to the subassemblies discussed in FIG. 1, two other panels are shown which are needed for a complete ultrasonic power supply system. A Power Inlet panel 20 includes a connection for the AC power line input and a regulatory compliant circuit protection device. In one embodiment, an IEC compliant power inlet connector is used, which can attach to any style power cord that is used internationally, and a combination power switch circuit breaker is used as a power switch that also provides over current protection. A System I/O panel 22 includes connectors to control the operation of the power supply. A System Input connector 23 provides control inputs so an external control system can activate or deactivate various power supply functions. A System Output connector 24 provides system operational status output signals to an external control system, if they are needed. A Configuration Port connector 25 provides a serial communications connection to a computer running a compatible software application that has the ability to modify and store setup parameters in the Motherboard memory. The connector 25 also includes a connector for the ultrasound output 26 from the power supply, which is connected to a compatible ultrasonic transducer that converts the ultrasonic output power to mechanical motion.

The thermostatically controlled cooling fan 15 directs cool air from outside the power supply chassis, through cooling fins on the Output Module power converter extruded heatsink, across impedance matching magnetic components on the Matching Module and out a cooling channel exhaust opening on the far end of the chassis. This design directs the cooling air stream across the power converter components that dissipate heat for effective cooling efficiency. The cooling air is also confined within the cooling channel area 27, so that dust or other environmental contaminants from outside the chassis, are not deposited on the electronic circuit boards inside the enclosure.

Several optional subassemblies are also shown in FIG. 1 to illustrate how the system architecture is designed to support the attachment of various optional assemblies with features that will further enhance the functionality of the overall system. An optional Status Control Panel 28 is shown attached to the Motherboard Status Control panel connector 19. This panel 28 includes LED status indicators 29 for system faults, power faults and ultrasound activation. The panel 28 also includes control switches 30 for activating the ultrasound output for test purposes and an ON/OFF Line control switch that disables the ultrasound output when required. It will be understood that other optional Status Control Panel modules with different features may be provided. Also shown in FIG. 1 is an Option Module 32 attached to the Motherboard option connector 18. In this configuration of the chassis, only one option module can be installed. A variety of option board functions are available, and the user will select which module is best suited to his particular ultrasonic process.

FIG. 1 illustrates how the modular architecture design results in a compact chassis that is easy to assemble, eliminating low-power wire harnesses, and the system can be configured with various option modules if they are needed. This design approach also allows easy analysis of system problems and, if required, service personnel can easily replace a defective subassembly.

FIGS. 3a, 3b, 3c, 3d and 3e illustrate a more advanced ultrasonic power supply with the subassemblies installed in a chassis. The core subassemblies shown in FIG. 1 are installed in the chassis and are identified using the same reference numbers used in FIG. 1. In addition to the subassemblies shown in FIG. 1, most of the subassemblies shown in FIGS. 2a, 2b, 2c and 2d are also present in FIGS. 3a, 3b, 3c and 3d. A Status Control panel that is used with basic systems is replaced in advanced systems with a Front Panel Process Control assembly 31, which is attached to the Front Panel Motherboard connector 16. The Front Panel Motherboard connector is designed to operate with multiple front panel designs that offer a variety of features at different cost levels. What is viewed as the front panel on basic systems (e.g., FIGS. 2a, 2b, 2c and 2d) becomes the rear panel on an advanced system with a front panel controller installed. The advanced system chassis has a slightly increased depth dimension to accommodate an Option Card Cage 34, which can support multiple option modules 36. The Option Card Cage connector 18 design supports option cards with a variety of features, and also supports future designs when they are needed.

The Option Card Cage 34 is directly connected to the motherboard and is designed to receive the option modules 36. The option modules 36 shown may include cards that support separate features, such as controls for different types of ultrasonic welding presses, and provide a variety of data communication interface ports. The Option Card Cage 34 is designed to permit the user to have access to all the option module slots from the outside of the system enclosure, without having to remove the enclosure cover. The option modules are also securely mounted into the option module card cage 34 without the need of any tools, using captive thumb screw attachments in this embodiment.

In some system configurations a Front Panel Power Switch 38 is required, such as in a rack mounted chassis where a power switch mounted on the enclosure rear panel would be inaccessible. The Front Panel Power Switch 38 used in this particular embodiment is an illuminated push button style switch. This type of switch is also used to provide power status indication to the operator, in advanced system configurations that use a graphic LCD panel and do not include other power status indicators. A detailed description of the power status indicator functionality is described below.

Each of the core and optional modules described above includes an EEPROM or other device that communicates with the motherboard 14, so that the motherboard 14 can determine what modules are connected to the motherboard. The EEPROM includes all the needed information about the module, such as part number, maximum power level, frequency, manufacture date, system shipping date, revision information for firmware or programmable logic, update records, factory testing data, service history data and any other information that may be useful for tracking the module. The motherboard 14 may communicate this information to the front panel controller 32 to be displayed or to the configuration port 25 when a front panel controller is not installed.

The EEPROM also includes information that enables the motherboard 14 to adjust setup control parameters to accommodate the modules attached. For example, if a user were to plug in a 20 kHz matching module, the motherboard would read the EEPROM in the matching module, determine that it is a 20 kHz matching module and preset the control registers on the motherboard correctly, without user intervention. Also, because all the modules are plugged into the motherboard, the different modules can be installed or replaced easily. The motherboard can report via the front panel controller or the configuration port, the absence of a module (unreadable EEPROM) or incompatible module installed, as an aid to troubleshoot and repair the system easily.

The height of the generator depends on the output power level. Generators rated over 1,200 W are packaged in a chassis having a height of between about 4 and about 6 inches, preferably about 5.25 inches. Generators rated for 1,200 W or less are packaged in a chassis having a height of between about 2.50 inches and about 4.5 inches, preferably about 3.5 inches.

Figure 4:
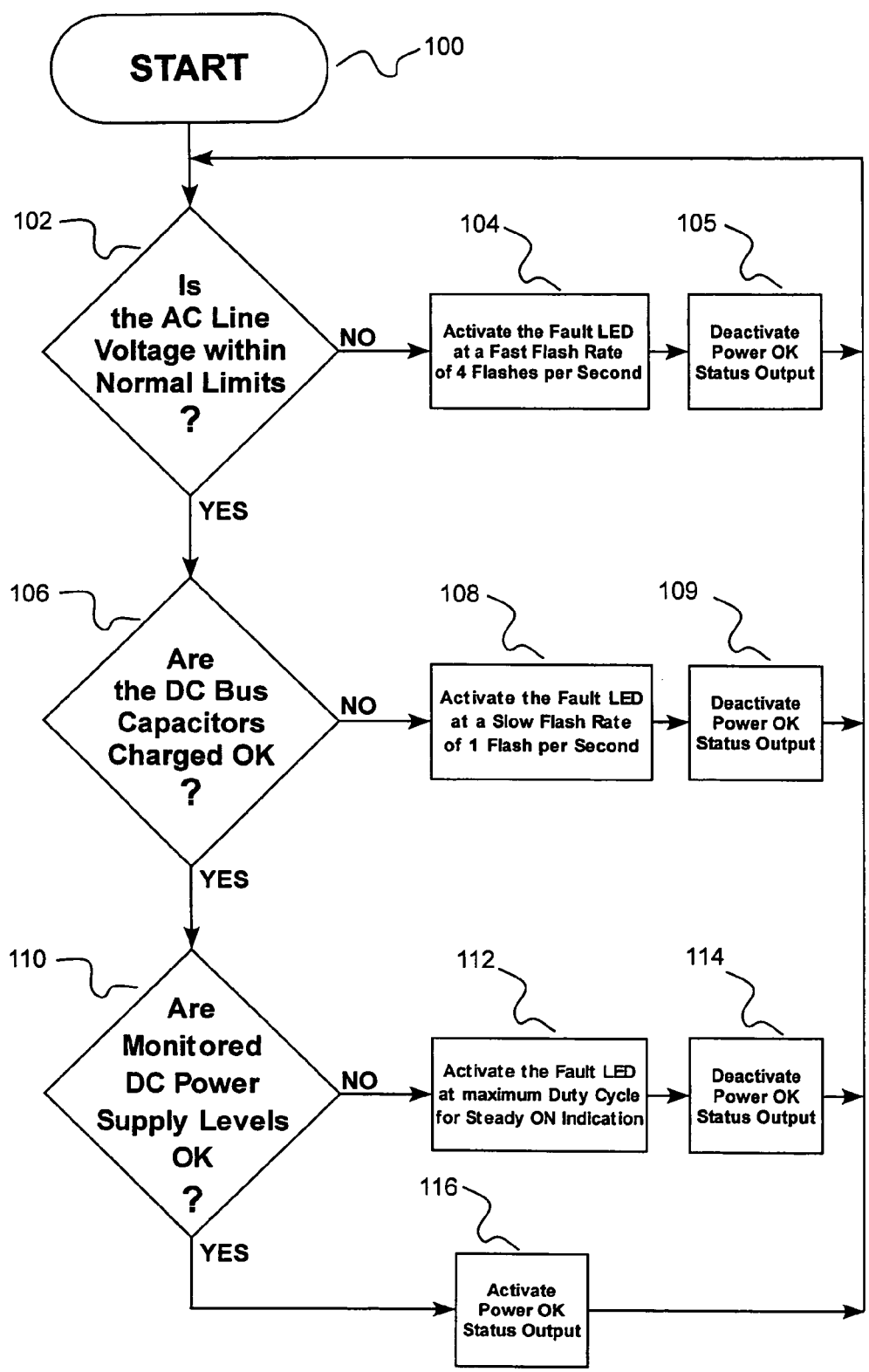
FIG. 4 is a flow chart illustrating the power supervisory functions with status indication according to one embodiment of the present invention.

Turning now to FIG. 4, one embodiment of an operational method of monitoring the power supplied to or from the input module 10 will be described. As described above, the input module 10 is coupled to the outside AC power supply, contains DC capacitors that provide power to the output module 11, and is directly connected to the DC control power supply 17. For proper system operation, it is important to ensure that all these power supplies are operating within their normal specified levels. The method described below utilizes a programmable logic chip on the input module 10 that checks three different parameters of the power supplies prior to enabling generator operation and, if a fault is detected, notifies the user which of the parameters is the source of the problem. At step 100, the power system is activated. First, at step 102, the system detects whether the AC power supply coming into the input module 10 is within the normal operating range for the equipment. The normal operating range is a standard that is preset into the chip on the input module 10, and is determined by the specified operating range of the ultrasonic generator. If it is determined that the AC power supply into the input module 10 is not within the normal range, i.e., there is an undervoltage or overvoltage, then the process proceeds to step 104, and the indicator light 29 or 38 flashes at a fast rate to indicate this problem to the operator. A POWER OK status output is deactivated in step 105 when this fault is active. In some embodiments, the indicator light 29 or 38 flashes between about 2 and about 6 Hz, although other rates may be used.

If it is determined that the AC power supply is operating within the normal range, then at step 106, it is determined whether the DC bus capacitors are appropriately charged from the rectified AC line voltage input. The charge of the DC capacitors is determined by the voltage magnitude across the capacitors (not shown) located on the input module 10, inside the ultrasonic generator. If the DC bus capacitors are not appropriately charged, then the process advances to step 108, and the indicator light 29 or 38 flashes at a slow rate. The POWER OK status output is deactivated in step 109 when this fault is active. For example, in some embodiments, the indicator light 29 or 38 flashes between about 0.5 and about 1.5 Hz.

If it is determined at step 106 that the DC bus capacitors are appropriately charged, the process advances to step 110. At step 110, it is determined whether the DC power supply levels are above an undervoltage limit. The undervoltage limit may be pre-programmed into the programmable logic chip on the input module 10, which are determined by the operating limits of the system circuitry. If the DC power supply levels are below the undervoltage limit, then, at step 112, the indicator light 29 or 38 glows steady. The POWER OK status output is deactivated in step 114 when this fault is active. However, if the DC power supply levels are above the undervoltage limit, then the indicator light 29 or 38 goes off, and all of the system functions are enabled for normal operation. The POWER OK status output is activated in step 116 when no faults are active.

As illustrated in FIG. 4 above, the operator can tell by looking at the indicator light 29 or 38 whether the ultrasonic welding system is powered properly, and if it is not, where the problem is. This information provides the user with an indication of where the problem is located, allowing for more cost-effective trouble-shooting. The operator does not need to perform separate troubleshooting on each of the different power supplies to find the problem area. Instead, the indicator light 29 or 38 pinpoints the problem area, making troubleshooting more effective. In other embodiments, the alarm signal may be an audio signal instead of a visual signal (such as the indicator light 29 or 38). The alarm may sound at different time intervals (fast beeping versus slow beeping) or may sound at different frequencies depending on which power supply is faulty. Also any other type of programmable circuitry could be substituted to perform the same functionality as described for the programmable logic chip that was used in this embodiment.

Figure 5:
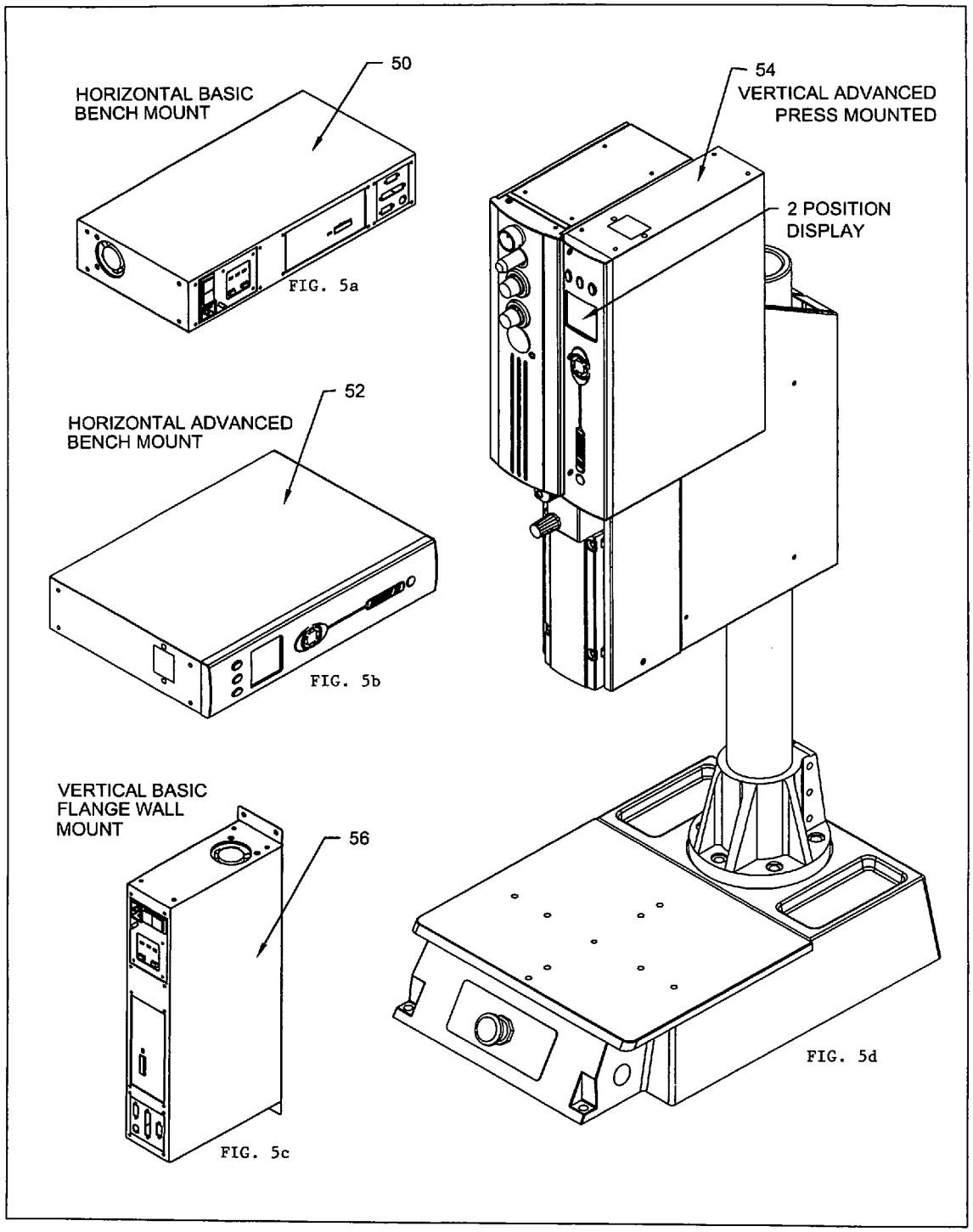
FIGS. 5a, 5b, 5c and 5d are perspective views of various chassis mounting options, using a modular architecture design according to one embodiment of the present invention.

FIG. 5 illustrates several chassis mounting variations that are possible using the modular assembly architecture. Standard bench mount style enclosures can be assembled, either with front panel process controller options 52 or without this option 50. A standard relay rack mounted variation on this chassis design is possible by adding rack mount ears to a bench mount chassis, which is designed to fit standard 19" rack cabinet mounting dimensions. Vertical chassis mounting 56, for installation into automation system cabinets, is also possible for base level systems, without a process control front panel. If a process control panel is required, a bench mount chassis can be mounted vertically, which would normally be mounted onto an ultrasonic welding press 54 as illustrated. Systems rated at lower power levels (1200 W and less) fit into a compact, lower profile enclosure, than the high power units.

Figure 6:
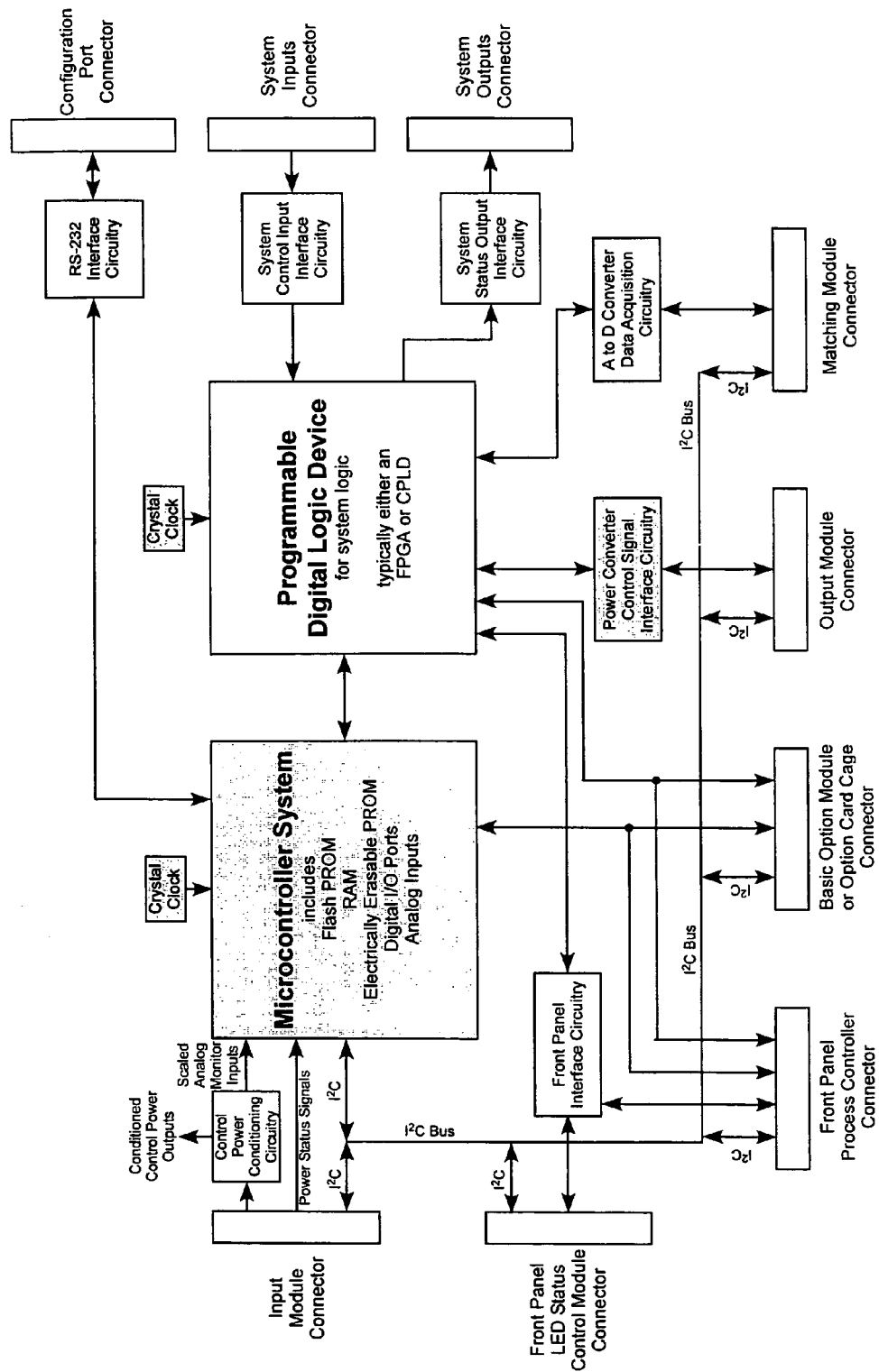
FIG. 6 is a block diagram of a digital ultrasonic power supply controller according to one embodiment of the present invention.

Turning now to FIG. 6 which illustrates a block diagram for an improved digital ultrasonic power supply controller. The digital control system is implemented using a standard microcontroller system, with unique firmware control algorithms, teamed with a unique programmable digital logic design and appropriately designed peripheral interface circuitry. This digital control board also functions as a system motherboard. This board includes electrical connectors for direct attachment, without any wire harnesses, to the core ultrasonic power supply modular subassemblies. Also included in the digital controller board design, are several additional connectors, designed to support the attachment of a variety of optional assemblies with features that will further enhance the functionality of the overall system.

The core system subassemblies are required to generate ultrasonic power from the power supply output. The Input Module rectifies and filters the ac line input power and monitors the status of the input power along with the output power from this subassembly. The Output Module converts the dc power from the Input Module to ultrasonic frequency ac power using a pulse width modulation power conversion methodology. This module also includes a heatsink temperature sensor to control the operation of the cooling fan and peak overload circuitry that protects the switching transistors from peak currents that are outside of the specified safe operating area curve. The Matching Module efficiently converts the ultrasonic frequency ac power from the Output Module to ultrasonic output power that drives the ultrasonic load and it also supplies critical analog signals to the main controller. These signals are used to calculate the ultrasound output power level, drive the Output Module at the correct resonant frequency and regulate the ultrasound amplitude output level. The System I/O connectors are needed for control input signals which activate the ultrasound output or other externally controlled functions and for status output signals to communicate the operating status of the system to an external control system. A configuration port is also needed to modify system setup parameters as needed or to update the microcontroller system firmware.

In this particular embodiment of this invention, the embedded microcontroller system interfaces to the various system subassemblies and options via digital I/O ports, analog input channels, an $I^2C$ peripheral controller and a serial UART interface. All of the core system subassemblies and option boards are equipped with flash PROM memory devices, pre-programmed at the factory with identification information that is read by the microcontroller. This information is used by the system to automatically configure itself, based on the modules and option cards that are installed when the system is powered up. The microcontroller uses several analog A to D channels to monitor the control power supply voltage levels from conditioned power outputs that originate on the Input Module and it also monitors a Power OK status signal from a power supervisory circuit on the Input Module. The design includes several digital interface busses attached to the microcontroller, so it can quickly communicate with the Programmable Logic internal registers or dual port RAM, the Front Panel Process Control board and the various option cards that can be installed. The microcontroller firmware is programmed with firmware algorithms that control the ultrasound output regulation characteristics, remote control scaling ranges, the average overload trip characteristics, the soft-stop functionality, average overload inhibit algorithm, frequency tracking algorithm and the frequency lock and hold functionality, which will be discussed in greater detail in the following sections.

The digital programmable logic device incorporates the interface logic needed for general purpose digital inputs and outputs throughout the system, but also includes time critical functions that are off loaded from the microcontroller tasks. The improved digital phase locked loop is implemented in the programmable logic design which locks-on to the motional bridge output sensed by a zero crossing comparator circuit. Also included is a high speed multiple channel data acquisition system that automatically performs the multiplication and averaging needed to accurately calculate the ultrasound true RMS power level. This logic also includes programmable counters that generate the pulse width modulation signals used to drive the Output Module at the correct resonant frequency and at a conduction duration to achieve the programmed ultrasound regulation level.

Figure 7:
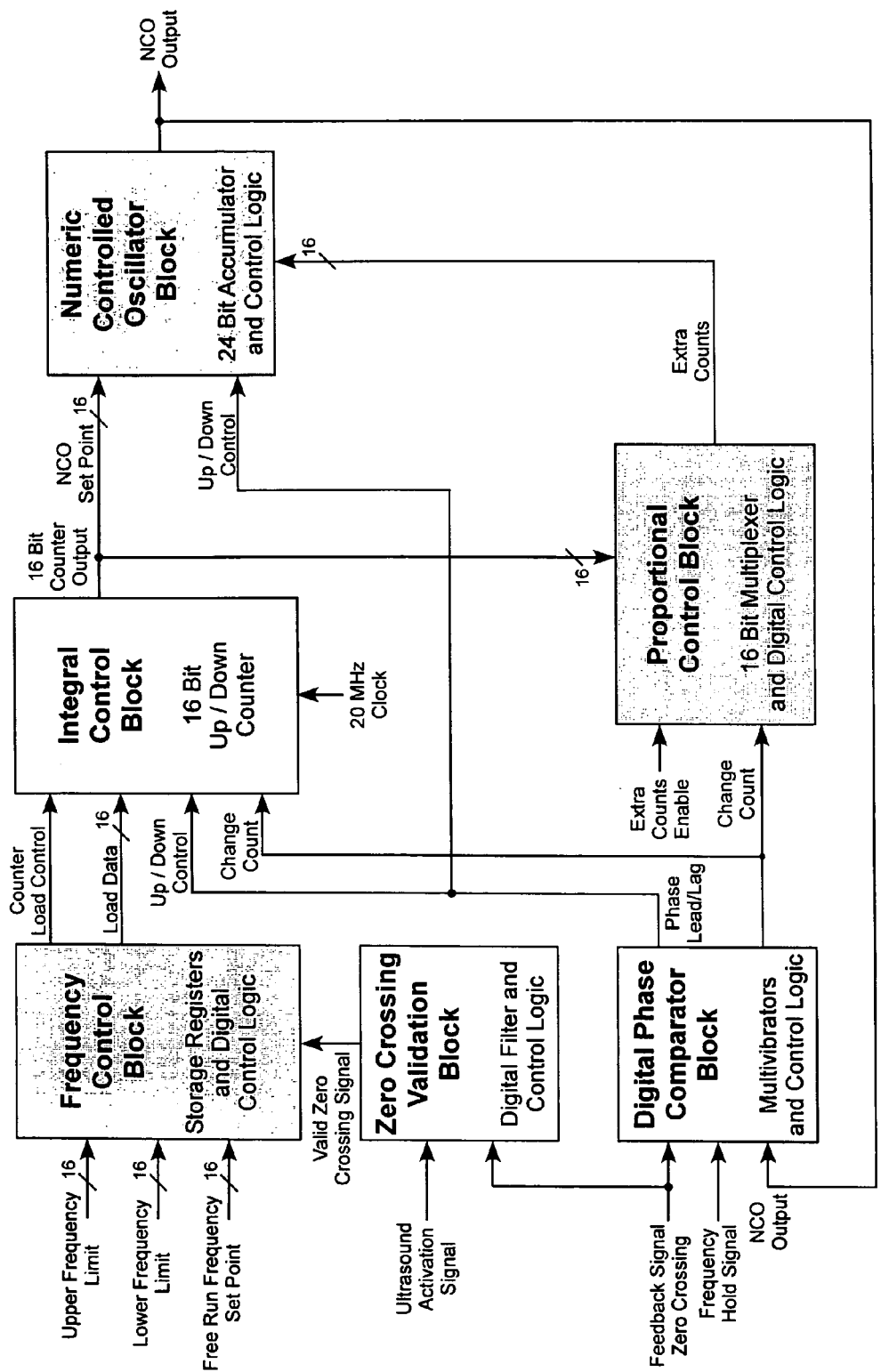
FIG. 7 is a block diagram for a digital phase locked loop according to one embodiment of the present invention.

Turning now to FIG. 7, is a block diagram of an improved Digital Phase Locked Loop (PLL), which in the present embodiment is implemented within the design of the programmable logic device. This design includes many of the elements included in conventional digital phase locked loop designs. It uses a numeric controlled oscillator (NCO) to develop a phase locked frequency output that is set from an integral control block that contains a digital up/down counter. A proportional control block is included, which contains digital logic to add or subtract extra counts when a large phase error is sensed, so the system can lock to the reference signal in a shorter period of time. A digital phase comparator provides output signals which indicate the phase error between the NCO output frequency and a reference frequency, which in this case, is a zero crossing signal derived from the motional bridge output signal, generated on the Matching Module from the driven ultrasonic transducer. One output signal detects whether the phase error is leading or lagging and the other signal output is a pulse that is equal to the phase difference between the phase comparator inputs. The design improvements are centered on the functional blocks that control the operation of these basic blocks.

The frequency control register block controls the capture range limits of the phase locked loop. An upper and lower frequency limit must be programmed into the registers inside the frequency control block. The frequency limits that are programmed, determine the absolute capture range of the phase locked loop and the system is not capable of locking on to a frequency higher or lower than these limits. Analog PLL circuits generally can not be dynamically programmed to achieve a specific frequency capture range, while this is a common feature found in many digital phase comparator circuits. When a reference frequency is not applied to the digital phase comparator reference input, which is the case when ultrasound is deactivated in an ultrasonic power supply, the NCO frequency will decrease until it reaches the programmed lower frequency limit value. The frequency operating range, or capture range, of an ultrasonic power supply is an important design characteristic, as well as the starting frequency of the system. It is desirable for the ultrasonic load to operate near the center of the frequency capture range of the power supply, but using a conventional design approach, the starting frequency would be at the lower frequency limit and to capture the load's resonant frequency, the system would have to slew hundreds of Hertz to lock to the correct frequency and phase. The improved PLL design adds an additional control register that sets the starting, or free running frequency. When ultrasound is deactivated and the zero crossing reference signal disappears, the NCO will run at the free run frequency set point. When ultrasound is activated, the system will continue to operate at the free run frequency as the ultrasound level rises until a valid zero crossing signal is detected by the zero crossing validation block. Once valid zero crossing signal are detected, logic in the frequency control block switches from the free run frequency mode to the phase lock mode, which enables the operation of the upper and lower limit registers. In one embodiment of this invention, the upper frequency limit is set to 21,000 Hz and the lower frequency limit is set to 19,000 Hz. The nominal ultrasonic operating frequency is 20,000 Hz, so the free running frequency can also be set to 20,000 Hz. When ultrasound is activated, the system will start driving the ultrasonic load on the power supply output at the free running frequency of 20,000 Hz and when the motional bridge output level increases above the noise level, the valid zero crossing signal will enable the system to phase lock to the actual resonant frequency of the load, which might be 20,037 Hz. The system only needs to slew about 37 Hz, instead of 1,037 Hz (without the free running frequency register) and it will lock to the frequency faster, with less stress on the ultrasonic load connected to the power supply output. This operation can be further enhanced with a Frequency Tracking firmware algorithm, which is discussed in a later section. Using this optional operating mode, the free run frequency register can be dynamically set, based on previous operating cycles. In the above example, if the Frequency Tracking mode was enabled, the free run frequency register could be dynamically set to 20,035 Hz and the initial driving pulses would be within 2 Hz of the actual ultrasonic operating frequency. The digital PLL will quickly lock to the correct frequency with minimal stress applied to the ultrasonic load.

The Digital Phase Comparator block has an added control input signal (Frequency Hold Signal) which can selectively disable the phase comparator function. Activating this signal will disable the phase comparator function and the NCO frequency will be held at its present frequency. This design improvement enables the Frequency Lock and Hold mode of operation that is discussed in a later section.

Figure 8:
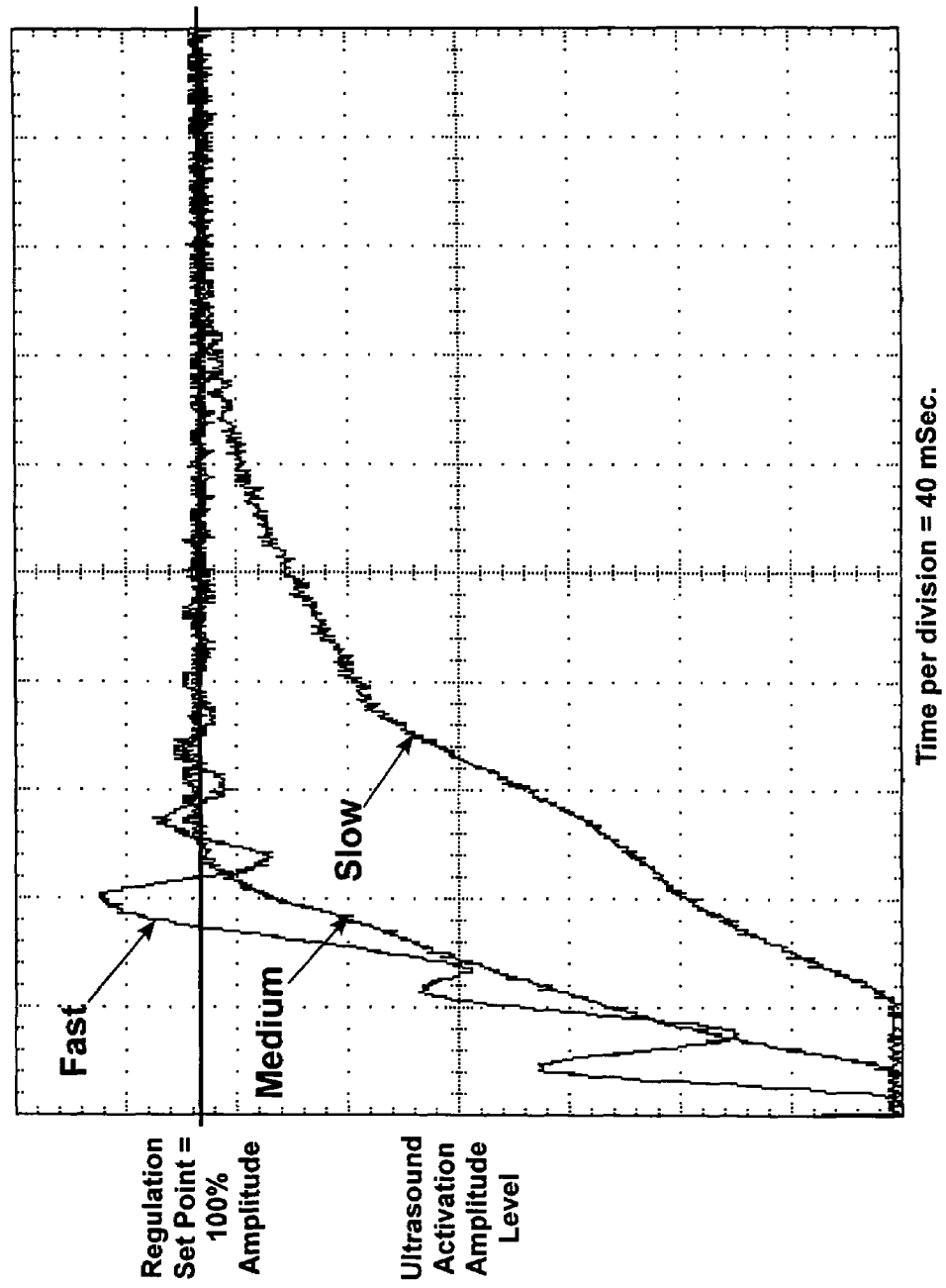
FIG. 8 is a graph illustrating a plurality of selectable regulation response curves with different regulation damping characteristics according to one embodiment of the present invention.

Turning now to FIG. 8, a proportional integral differentiator (PID) regulation function is implemented in the firmware and allows the user more control over the amplitude regulation characteristic. In prior ultrasonic generators, the values for the proportional integral differentiator were determined by the analog hardware. Therefore, the regulation characteristics were fixed and could not be altered. As shown in FIG. 8, three different curves of amplitudes versus time response characteristics are illustrated that could be user selected. Each of these response characteristic curves has a label—fast, medium, and slow. The user would be able to select between these three different curves. In some welding applications, the user may want to reach the set amplitude as fast as possible without concern for any overshoot (for small ultrasonic horns). In such a case, the user would select the "fast" curve. Alternatively, the user may not care how fast the set amplitude is reached (for large massive ultrasonic horns), but may want to avoid any overshoot. In that case, the user would select the "slow" curve. A user who wants to reach the set curve relatively fast, but with minimal overshoot would select the "medium" curve (for typical ultrasonic horn sizes). These selections would alter the PID internal control parameter coefficients in the microcontroller firmware, thereby altering the curves.

As mentioned above, in prior ultrasonic generators, because the PID variables were established by hardware component values, the regulation characteristics were embedded in the analog circuit design. With this embodiment, the user may now switch between the various regulation curves, choosing the regulation curve that best suits the ultrasonic application.

The ultrasonic generator provides selection choices for the operator to control the regulation set point through either the local user interface, which does not require any range scaling or through a remotely located automation current loop controller. The operator can also select the desired output regulation mode. The system output can operate in either a constant amplitude mode, where the amplitude of the ultrasonic transducer displacement is regulated to a user programmed set point value, or a constant power mode can be selected that regulates the ultrasonic power output level to a user programmed set point value. The following figures illustrate the various ranges that are available when the regulation set point is controlled remotely with an automation control system.

Figure 9:
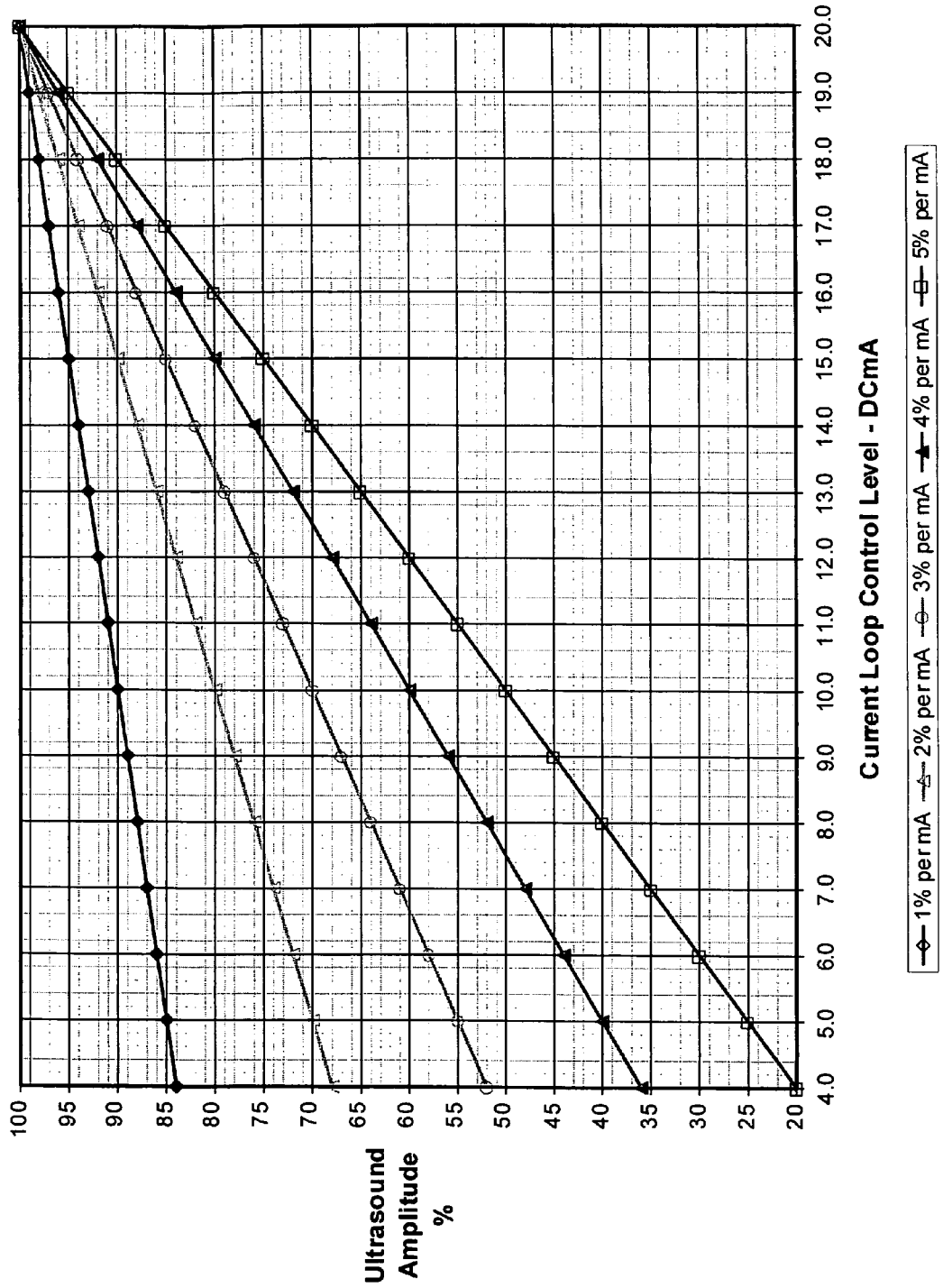
FIG. 9 is a graph illustrating remote amplitude regulation control with a variety of ranging selections according to one embodiment of the present invention.

As shown in FIG. 9, the amplitude of the ultrasound may be remotely controlled. In the embodiment illustrated in FIG. 9, there are five different amplitude scales. FIG. 9 illustrates the ultrasound amplitude percentage as a function of current loop control level (mA). The maximum amplitude regulation set point is always 100% and is represented by the maximum input signal control level of 20 mA. The scaling ranges in this embodiment change the desired amplitude adjustment range that is available. The wider range of the adjustment span, the lower the resolution of the set point level. For example, if the 1%/mA scale is used, the span goes from an amplitude of 100% down to 84%. However, if the 5%/mA scale is used, then the span extends from 100% down to 20%. Thus, the user can select which span is to be used, depending on the range and the scale that suits the user's requirements.

Figure 10:
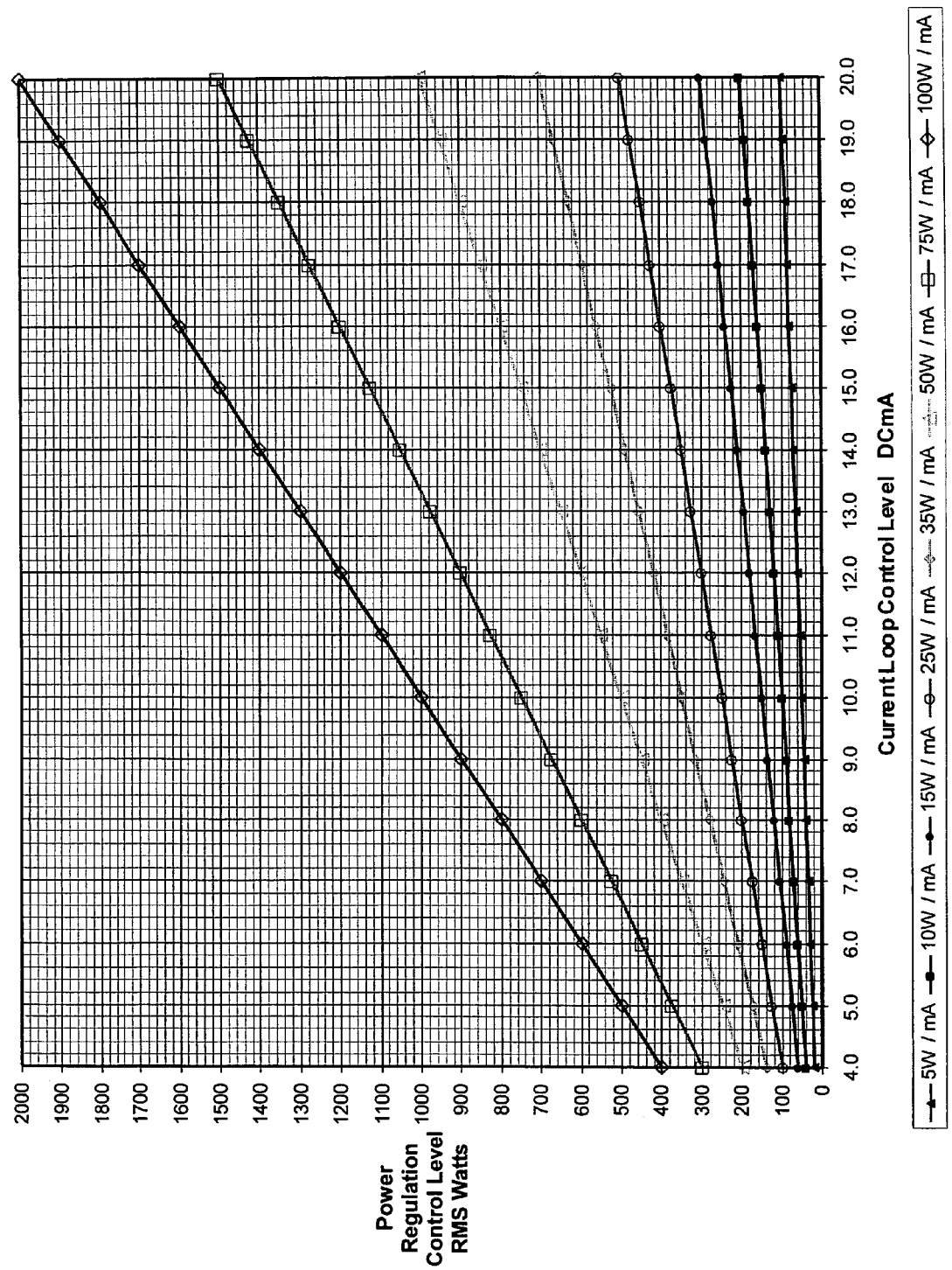
FIG. 10 is a graph illustrating remote power regulation control with a variety of ranging selections according to one embodiment of the present invention.

Similarly in FIG. 10, the ultrasonic generator can be setup by an operator to remotely control the power regulation set point. The ultrasonic systems of the present invention are rated from a maximum power rating of about 2,400 Watts to a minimum power rating of about 120 Watts, inversely proportional to the ultrasound frequency (20 kHz systems=2,400 W and 70 kHz systems=120 W). If the same scaling factor was used for all of these power ratings, the result would be a poorly optimized system. In other words, with a 2,400 Watt system, the controller could only adjust the power up to 100 Watts, using a 5 Watts per milliamp scaling factor, with a standard 4-20 mA current loop controller. Conversely, using a 100 Watt/mA setting would not be suitable with a 120 Watt rated system and the controller would not be able to adjust the power level with the desired accuracy.

To address this problem, one embodiment of the present invention allows the operator (or user) to select an appropriate control range via the motherboard and effectively control the power regulation set point on any ultrasonic generator, regardless of the power rating. As shown in FIG. 10, a graph illustrates eight controller scaling ranges from 100 Watts/mA to 5 Watts/mA. Each line represents a different scaling range. The graph plots the standard current loop control level (4-20 mA), which is the current level set by the user's automation control system, versus the power regulation control level, which is the desired power regulation level. As shown in FIG. 10, at the 100 W/mA level, the maximum 20 mA level would result in a power regulation level of 2000 W, the minimum 4 mA level would result in a power regulation level of 400 W, and a 1 mA control level change would result in a 100 W change in the power regulation set point. As stated above, for an ultrasonic generator rated at around 1200 W, the 100 W/mA increments may be too large. Therefore, a user could instead choose to use the 25 W/mA scaling, which begins at about 100 W, and increases by 25 W increments to 500 W. The 25 W/mA scaling may be too great for even lower power systems, such as one that is rated at 120 Watts. In such a system, the operator would choose to use the lowest scaling range, providing 5 W/mA. The 5 W/mA scaling range gives the user the greatest precision at low power levels.

In the embodiment shown in FIG. 10, eight different scales, or lines 30a-30h, are illustrated. However, depending upon the application, any number of scales (or lines) may be used. These scales are implemented in the firmware, which controls the ultrasonic system response to the current loop input signal.

Figure 11:
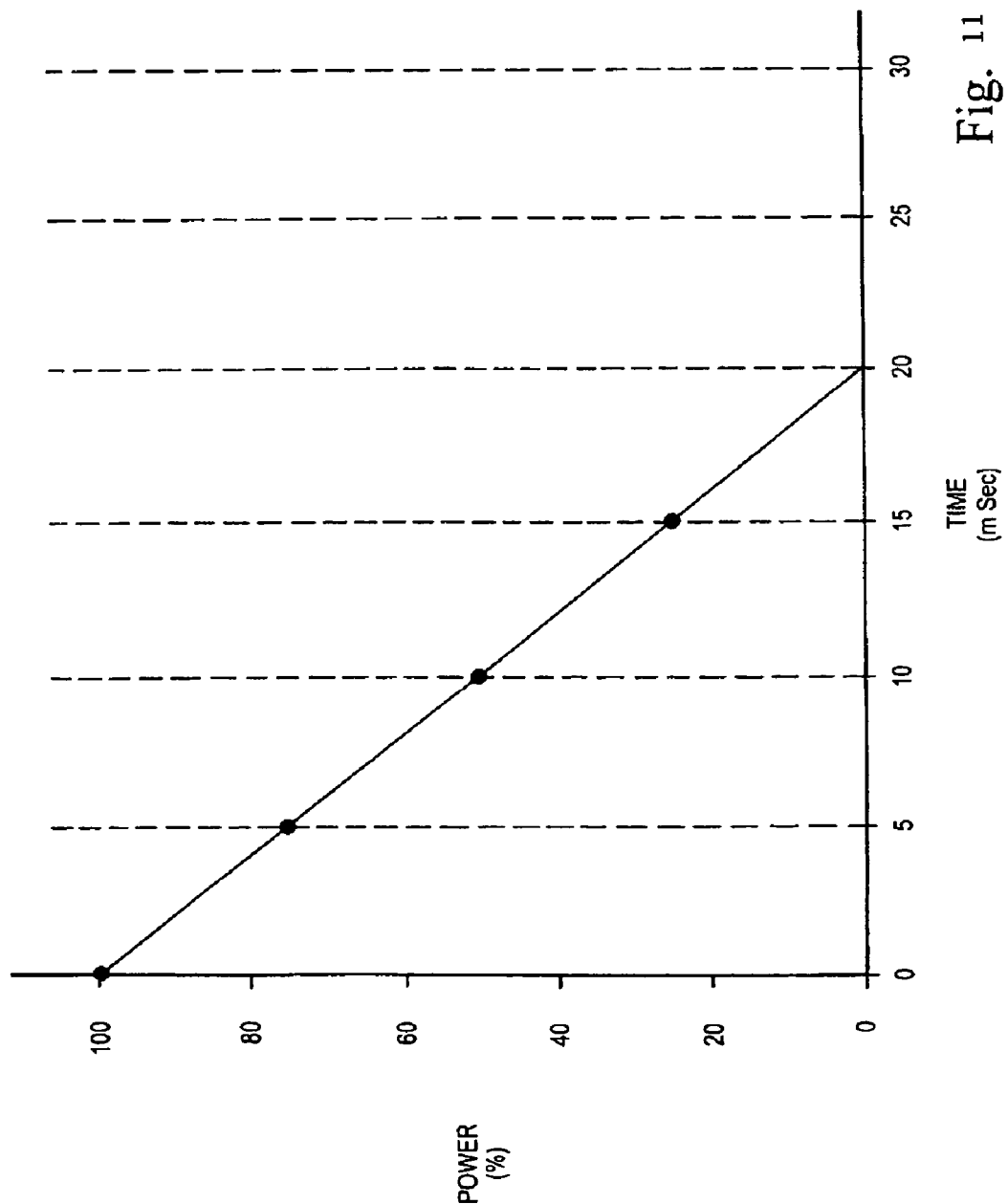
FIG. 11 is a graph illustrating a soft-stop function according to one embodiment of the present invention.

Turning now to FIG. 11, a graph indicating a soft-stop function is illustrated. Currently, most ultrasonic welding systems utilize some sort of a soft-start amplitude ramp-up function. In many of those systems, the user can select or program an appropriate soft-start ramp-up time. The graph of FIG. 11 illustrates the opposite effect. As shown in this graph, a soft-stop time of 20 milliseconds has been implemented. Then, when the welding system switches the ultrasound off, the system reduces the ultrasound power level 5% (100% divided by 20 milliseconds) every millisecond until the system is at zero power level. In current systems, when the ultrasound output is deactivated, the system switches from full amplitude to zero instantaneously. This type of operation affects the life of the transducer, causes unusual acoustic noises and this results in other unnecessary component stress. Utilizing a soft-stop approach is less stressful to the ultrasonic probes and stack components. Generally, the ramping down to 0% can be accomplished much faster than the ramp up, but in some embodiments, the ramping down can occur at the same or slower rate than the ramping up. Also, the above-described embodiment describes a particular rate, but it should be understood that other rates could be user programmed or selected.

Figure 12:
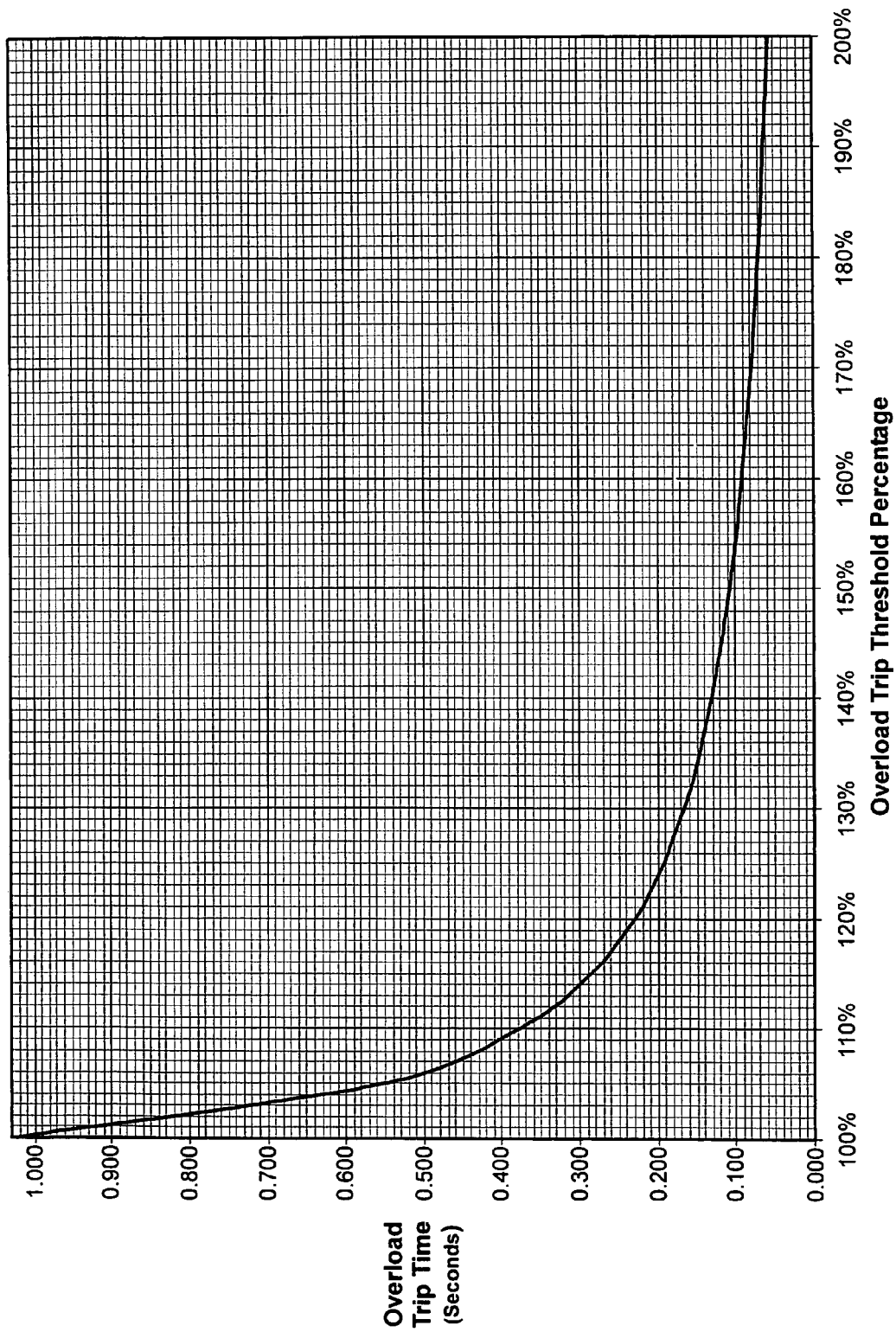
FIG. 12 is a graph illustrating an average overload trip response time according to one embodiment of the present invention.

Turning now to FIG. 12, a graph illustrating an average overload time delay characteristic. The graph illustrates the overload trip time versus the overload trip threshold percentage. The overload trip threshold percentage is calculated by dividing the presently measured output power level by the overload trip threshold power level. For example, if the overload trip threshold is set to 1200 Watts, then when the measured output power level reaches 1800 Watts, the overload trip threshold percentage would be 150%. The overload trip time is the amount of time the power is allowed to stay above the trip threshold before the system shuts down. Incorporating this delay time (less than a second), allows the ultrasonic generator to keep running even if there is a momentary increase in power, as long as the power decreases in a period of time that is less than the overload trip time. As illustrated in FIG. 12, the overload trip time is a nonlinear function, as the overload trip threshold percentage increases, the overload trip time decreases rapidly. For example, if the overload trip threshold percentage is 110%, then the overload trip time is approximately 0.38 seconds. However, if the overload trip threshold percentage is 160%, then the overload trip time is only about 0.09 seconds. The average overload trip response time is implemented in a firmware algorithm. The overload response characteristics are very well characterized and repeatable regardless of the generator power rating.

Figure 13:
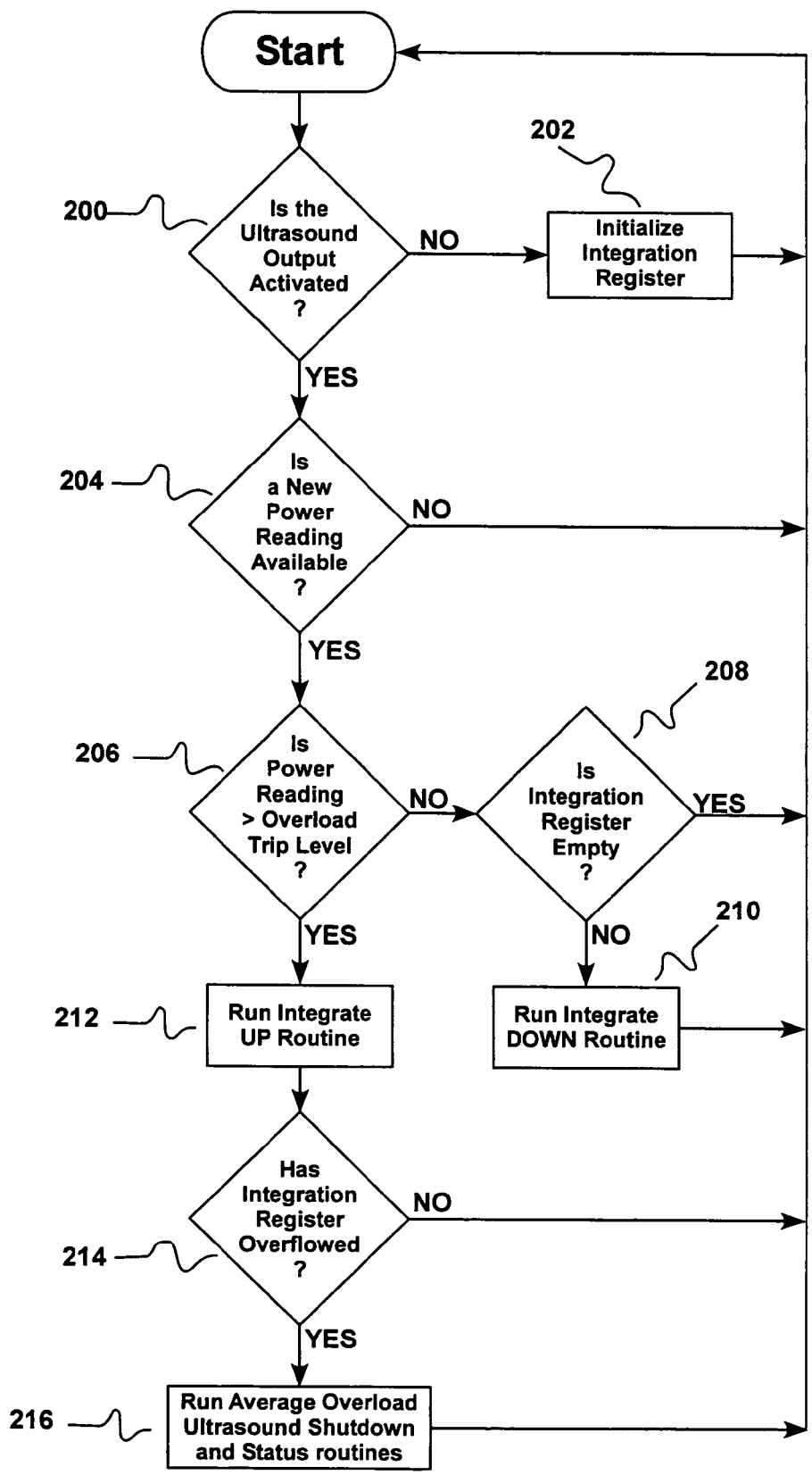
FIG. 13 is a flowchart illustrating the overload trip response time integration method to achieve the characteristic illustrated in FIG. 12 according to one embodiment of the present invention.

Turning now to FIG. 13, a flow chart describing how the response characteristics of FIG. 12 are derived is illustrated. This firmware algorithm only runs when the ultrasound output is activated (step 200) and will initialize the average overload integration register (step 202) when the ultrasound output is deactivated. At step 204, the firmware monitors the power measurement register, which is continuously updated. The power measurement, monitored in step 204 is updated periodically. In some embodiments, the time period is once every 500 microseconds, or 2000 times every second. At step 206, the sample power measured is compared to the preset overload threshold value. If the power is less than 100%, then there is no overload condition and the process then checks if the integration register is empty (step 208). It will return to the Start or run the Integrate DOWN routine (step 210), if the integration register is not empty. If the power is 100% or greater, the firmware will start an Integrate UP routine (step 212) that will duplicate the graph of FIG. 12, for the overload percentages shown on the graph. Depending on the overload power percentage, the firmware allows the system to operate at that power for a set amount of time. For example, in the graph shown in FIG. 12, the system can operate at 150% of the set power for a little over one tenth of a second. After that, if the power does not drop below 100% power, the firmware algorithm will integrate up until the integration register overflows (step 214) and will run average overload routines that shuts off the ultrasound output and activates the appropriate status indicators (step 216). The firmware algorithm also includes an integrate down function (step 210) for a situation where the power level has only a momentary power surge above the trip level and the power then drops below the average overload trip threshold. The system is then able to recover to the previous non-overload operational state. The Integration Register is re-initialized in step 202 when the ultrasound output is deactivated by an average overload shutdown or the termination of a normal welding cycle and the system is then ready for the next welding cycle to start.

The graph illustrated in FIG. 12 is merely one example of a graph that can be implemented with a firmware algorithm. In some embodiments, the relationship between the time and the power percentage may be linear or otherwise functionally related. In some embodiments, multiple response characteristics may be implemented and the user could choose the desired overload characteristic.

Figure 14:
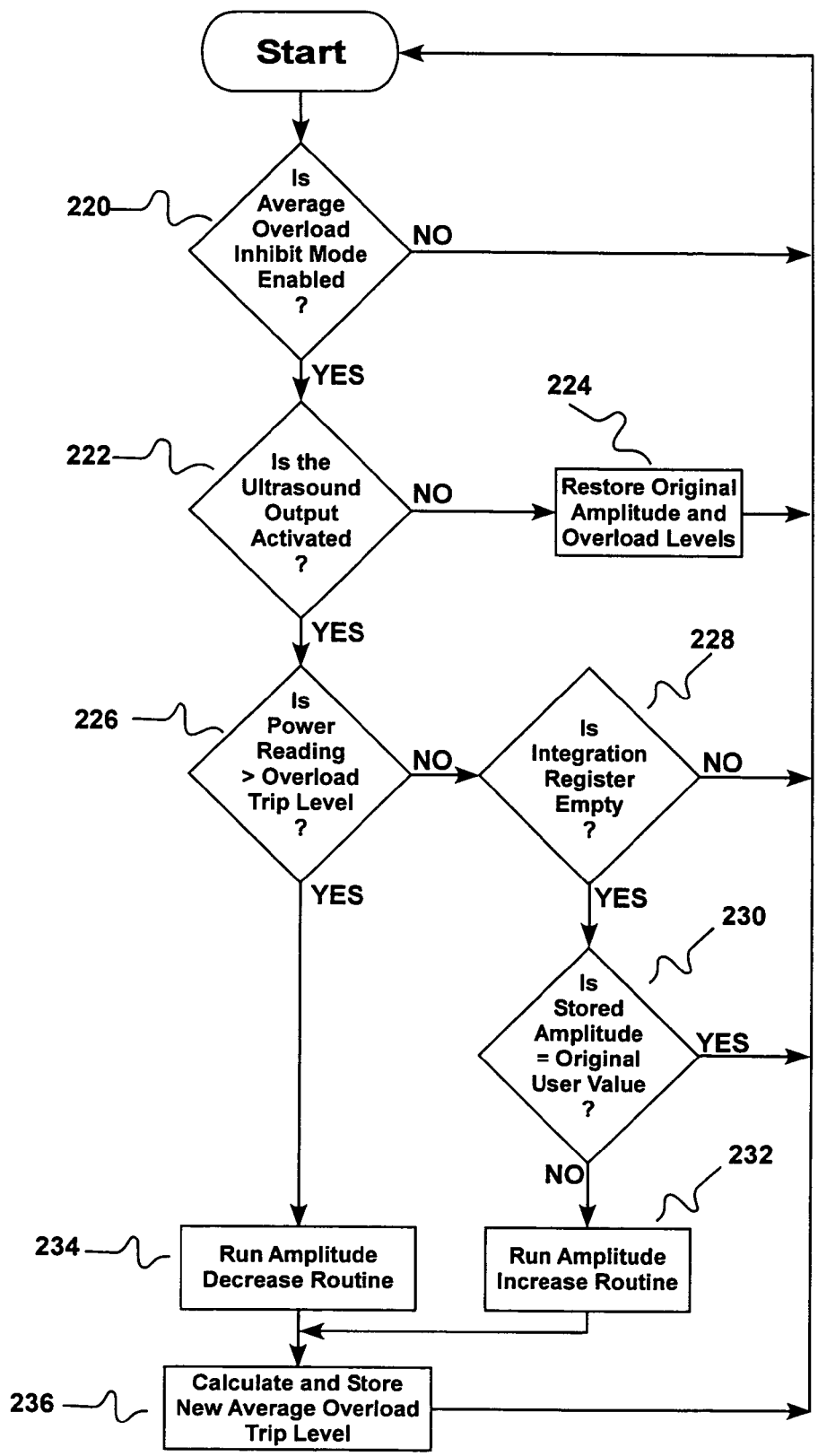
FIG. 14 is a flow chart illustrating an overload prevention methodology according to one embodiment of the present invention.

Turning now to FIG. 14, a method for preventing an average overload trip will be illustrated. As background, during operation of the ultrasonic welder, the average overload firmware algorithm protects the generator power conversion circuitry from damage. An average overload will terminate the welding cycle when the generator power output level exceeds the generator power output rating. The generator power output rating is directly proportional to the ultrasound amplitude setting. For example, an ultrasonic welder rated for 2,400 Watts will provide 2,400 Watts at 100% amplitude. The average overload will trip when that power level (in this case, 2,400 Watts) is exceeded. If the ultrasound amplitude is set for 90%, then the average overload threshold will be reduced to 2,160 Watts (90% of 2,400). In some cases these system shutdowns caused by overloads, are a nuisance, which disrupt production. When working with some plastic parts, more power may be needed to join some parts than others. In some cases, preventing an average overload fault is desirable. This can be accomplished by decreasing the power level by reducing the ultrasound amplitude level, but this will extend the amount of time needed to weld the part. To prevent the average overload from tripping, a user selectable firmware algorithm monitors the average overload integration register value and will automatically decrease the ultrasound amplitude level as needed, every power measurement period (500 microseconds), so the integration register will eventually stop integrating UP, which would cause an average overload to terminate the welding cycle.

Turning back to FIG. 14, the functionality is user selectable and would be enabled (step 220) only for appropriate welding applications and this algorithm will not run if it is disabled by the user. This firmware algorithm will only run when the ultrasound output is activated (step 222), with the amplitude and overload settings restored to their original state (step 224) when the output is deactivated. When the latest power measurement is greater than the overload trip level (step 226), an amplitude decrease routine will run in step 234. Since the average overload trip level is directly proportional to the amplitude setting, a new average overload trip level must be determined and stored in step 236. When the most recent power measurement is less than the overload trip level (step 226), the average overload integration register is checked in step 228. If the register is empty, the firmware returns to start. If the register is not empty, a check is made to see if the amplitude has been changed in step 230. If the amplitude is not equal to the original setting, a routine that increases the amplitude is run in step 232. When the amplitude is changed, a new average overload trip level must be determined and stored in step 236. If the stored amplitude from step 230 is the same as the original amplitude setting, the firmware returns to the start. The amplitude increase routine in step 232, allows the system to recover from a temporary power surge with only a momentary decrease in the ultrasound amplitude level.

Figure 15:
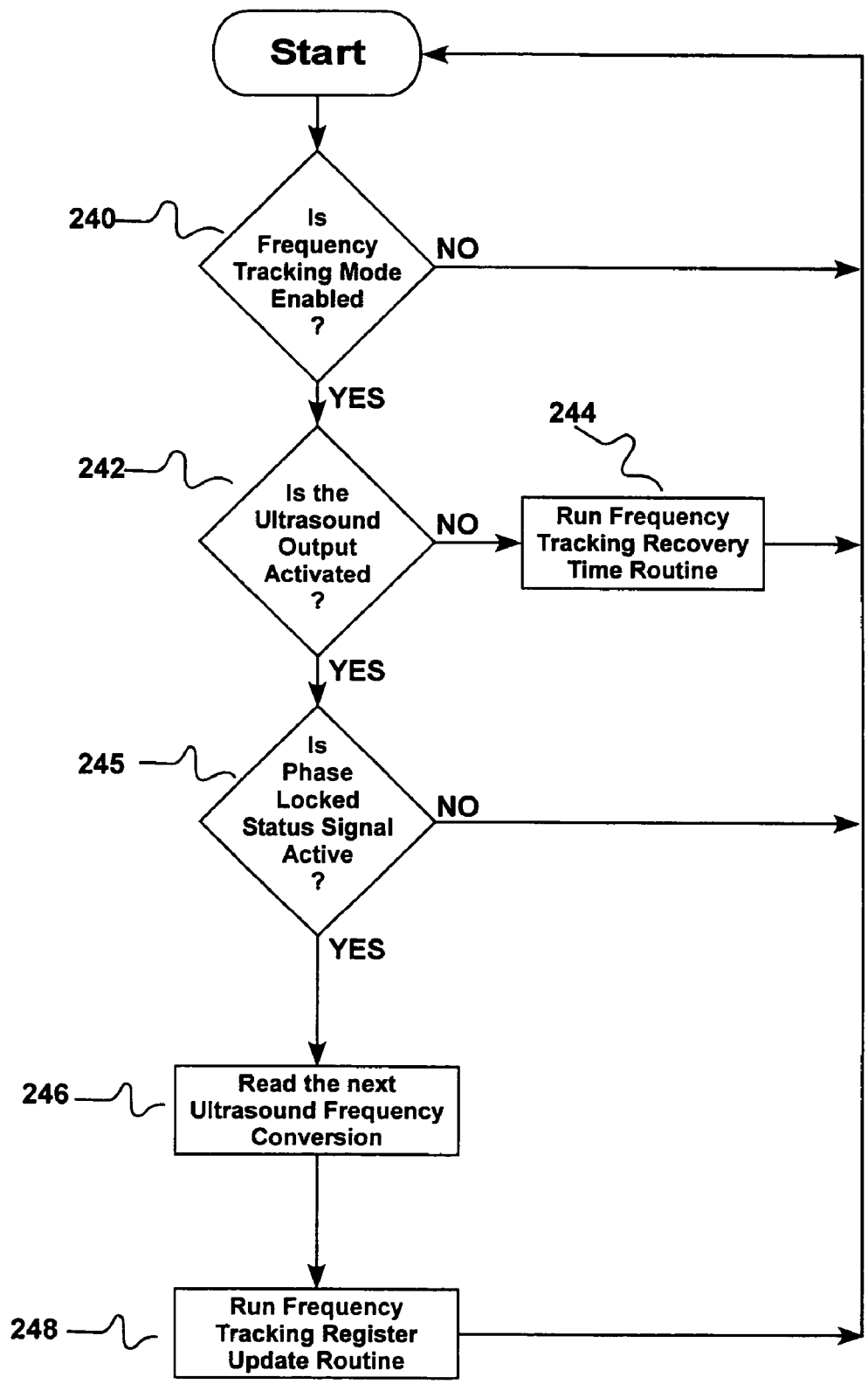
FIG. 15 is a flow chart illustrating a method for locking a phase lock loop at a particular frequency and tracking the changing frequency as it is used, by updating the free running start-up frequency according to one embodiment of the present invention.

Turning now to FIG. 15, a flow chart illustrating the process of dynamically adjusting a free-run frequency (the phase locked loop circuit starting frequency) of the welding system. The process is most useful in cyclic plunge welding applications, but can be used in restarting a continuous welding application also. In some operations, the free run frequency is set to where the stack operates (e.g. 20 kHz). However, the stack may actually be tuned to a resonant frequency that varies slightly from the free run frequency of 20 kHz. However, to make the system operate more efficiently, the free run frequency should be set to be very close to the operating frequency. This firmware controlled function can be selected by the user if it is suitable for the particular welding application. This is checked in step 240 and this algorithm will not run if it is disabled by the user. This firmware algorithm only runs when the ultrasound output is activated (step 242). When the ultrasound is off, a recover time routine is run in step 244, which will slowly return the free run frequency setting to a user programmed cold stack starting frequency. If the ultrasound is activated, the firmware waits until a phase locked status signal activates in step 245. After the phase locked loop circuitry is locked onto the stack frequency, the operating frequency is read in step 246. The frequency tracking register is updated in step 248, which sets the free run frequency to the present operating frequency and then returns to the start. If the ultrasound is switched off for extended periods of time, or when the system is first powered on, the frequency tracking recovery routine in step 244 will set the free run frequency to a user selected default value. These are situations where there is not any recent operating frequency information available to track. For a continuous welding process, the firmware algorithm needs to be repeated periodically, instead of updating the frequency only once. By tracking the phase lock loop frequency, overload trips can be avoided and also, the ultrasonic welding system can be operated more efficiently and with fewer problems.

Figure 16:
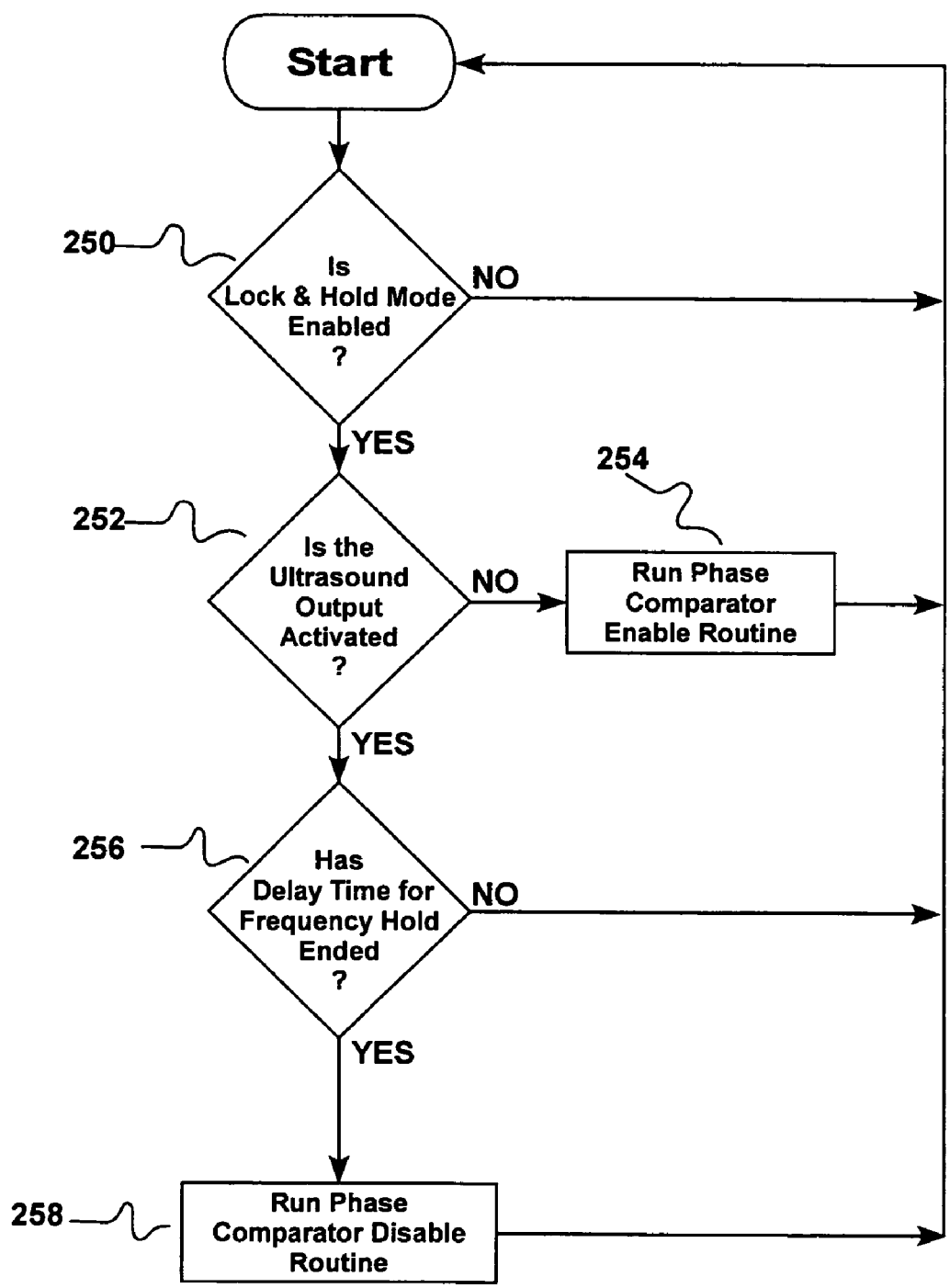
FIG. 16 is a flow chart illustrating a method for initially enabling and then selectively disabling a phase locked loop comparator tracking function to maintain the previously captured lock frequency according to one embodiment of the present invention.

Turning now to FIG. 16, a flow chart is illustrated describing a method to enable an ultrasonic welding system to prevent a frequency lock error. This occurs when the phase locked loop sensing circuitry jumps to an incorrect frequency due to the ultrasonic stack coupling to a non-resonating load. During some applications, such as when using an ultrasonic welder to cut frozen foods, particularly frozen brownies, the temperature of the frozen product is often below 0° F. The ultrasonic welding stack will then become coupled to the frozen food load. This coupling causes the frequency to suddenly change to an incorrect frequency, causing the welder to cease cutting due to an overload trip condition. This firmware controlled function can be selected by the user if it is suitable for the particular welding application. This is checked in step 250 and this algorithm will not run if it is disabled by the user. This firmware algorithm also only runs when the ultrasound output is activated in step 252. When the ultrasound output switches off, the phase locked loop phase comparator function is re-enabled in step 254, which allows normal phase locked loop operation the next time the ultrasound output is activated. When the ultrasound switches on, the phase locked loop functions normally until a user determined time delay ends in step 256. After the time delay ends, the phase comparator function is disabled when a digital control signal is activated by step 258. Disabling the phase comparator locks the ultrasonic operating frequency and it will not change for the remainder of the weld cycle duration. The time delay that is user specified in step 256 must be programmed to end before the ultrasonic welding stack couples to the non-resonant load.

In previous systems, the phase locked loop locks onto the feedback signal. However, in some cases, the feedback signal may be erroneous, such as in situations of cutting frozen food as described above. In this embodiment, the system locks onto the correct frequency while the ultrasonic horn is in the air. Then, when the horn begins to cut and the PLL receives bad feedback, the PLL phase comparator operation is disabled, thereby ignoring the bad feedback signal. Such operation is allowed by the use of digital components. In prior ultrasonic generators that included all analog components, the PLL phase comparator operation could not be altered. In contrast, in the present embodiment, the digital PLL function can be altered to fit the changes in the system when needed.

Existing triggering methods for starting the ultrasonic welding cycle include the following:

Trigger by force (or dynamic triggering), which activates ultrasonic energy once the pressure (force) on a sensing element exceeds the preset value;

Trigger by distance which activates ultrasonic energy once a preset distance is reached;

Pre-trigger, which activates ultrasonic energy in the air either by time or distance (Pre-Trigger Flag).

These triggering methods require additional hardware to implement properly, such as force sensors (load cells), distance encoders or limit switches, and have mechanical limitations, which may result in welded parts with excessive variations.

Figure 17:
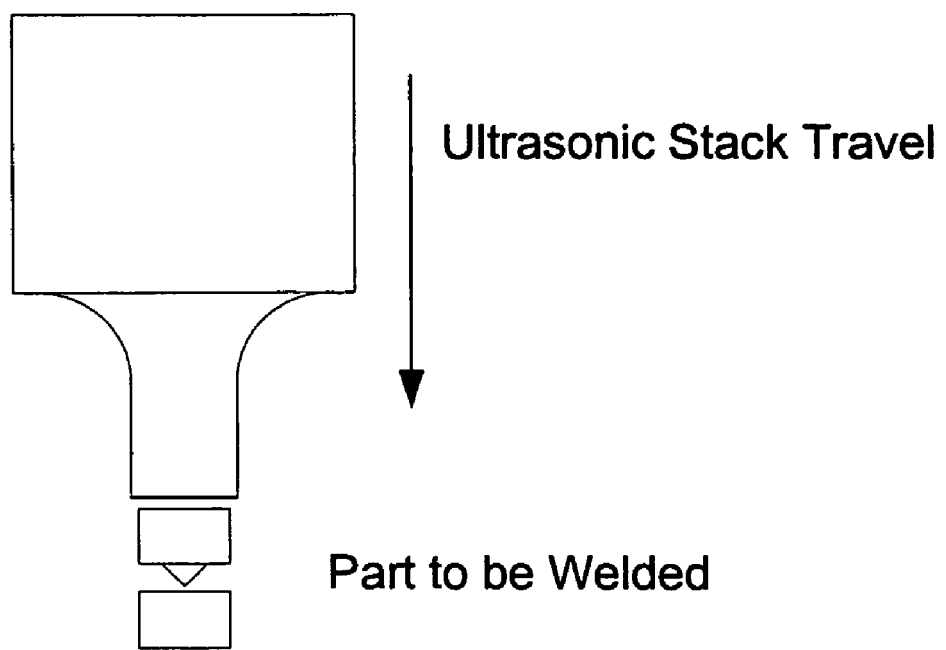
FIG. 17 is a schematic illustration of an ultrasonic welding stack advancing toward a part to be welded.
Figure 18:
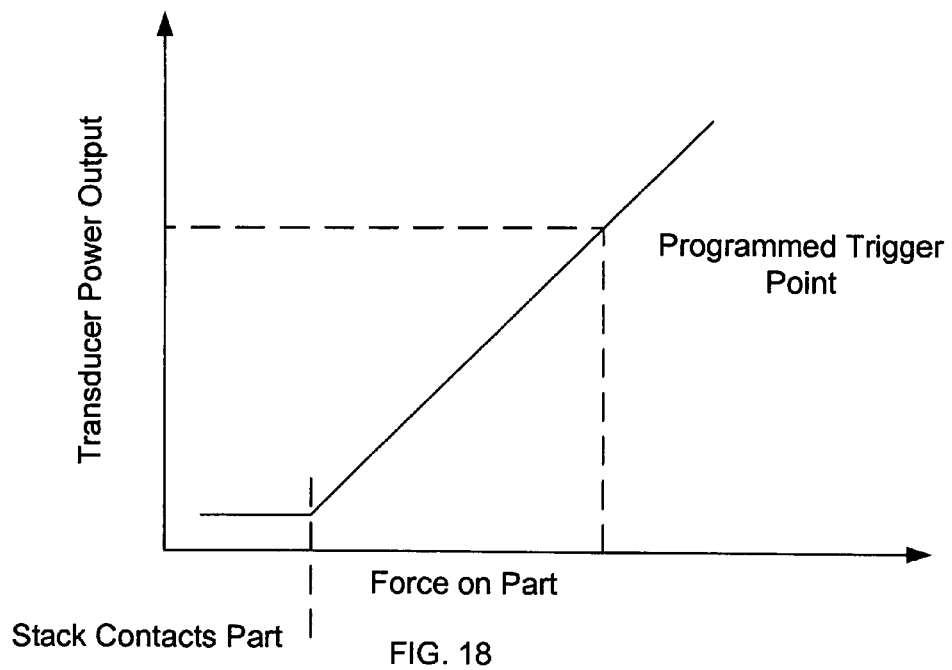
FIG. 18 is a graph of transducer power output as a function of the force on the part.

A new triggering method eliminates a number of mechanical and electrical components. This approach is based solely on the electronic components and firmware that are part of modern ultrasonic welding systems, such as, Dukane's iQ series or DPC4+. This new method provides better accuracy, repeatability and weld quality than the existing methods due to the high accuracy and repeatability of the power measurements. The new method includes the following steps (see FIGS. 17 and 18):

1. Operator programs a value for "Trigger by Power."
2. Cycle starts.
3. Stack moves toward the part to be welded (see FIG. 17).
4. Stack is running at 10%-40% (user adjusted) amplitude to prevent marking the part.
5. Stack applies pressure to the part—ultrasonic power increases with pressure (see FIG. 18).
6. Power trigger limit is reached—this starts the welding cycle (see FIG. 18).
7. Amplitude is increased to 100% (or the value necessary for the proper weld).
8. From this point on several different welding techniques could be utilized, e.g., weld by time, weld by energy, weld by collapsed distance, weld by peak power, or others.
9. Part is welded.

Power comparisons can be handled inside the firmware with the processing time of only a few microseconds. This provides higher accuracy and repeatability producing defect free welded parts.

Figure 19:
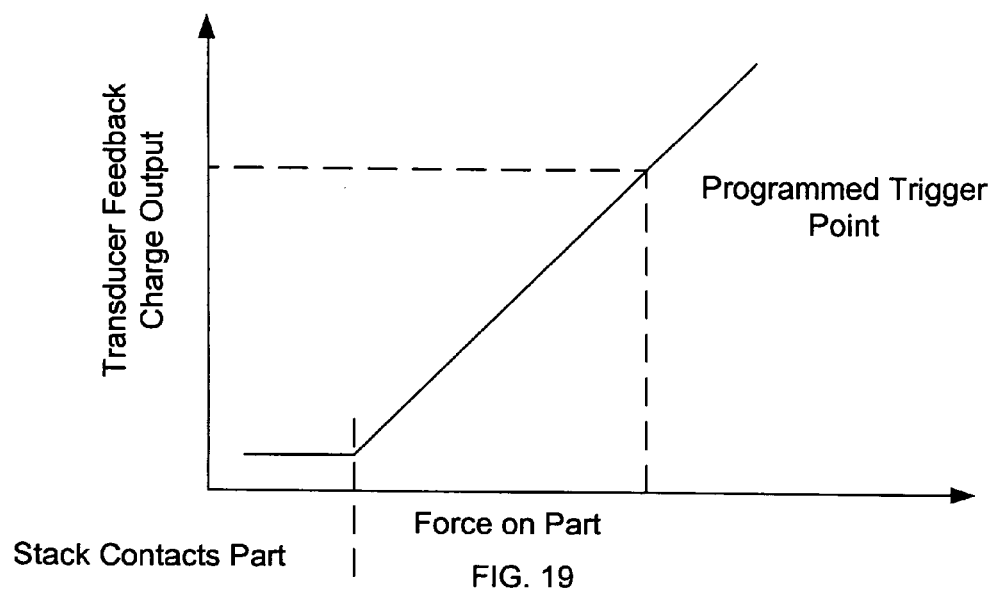
FIG. 19 is a graph of transducer feedback charge output as a function of the force on the part.
Figure 20:
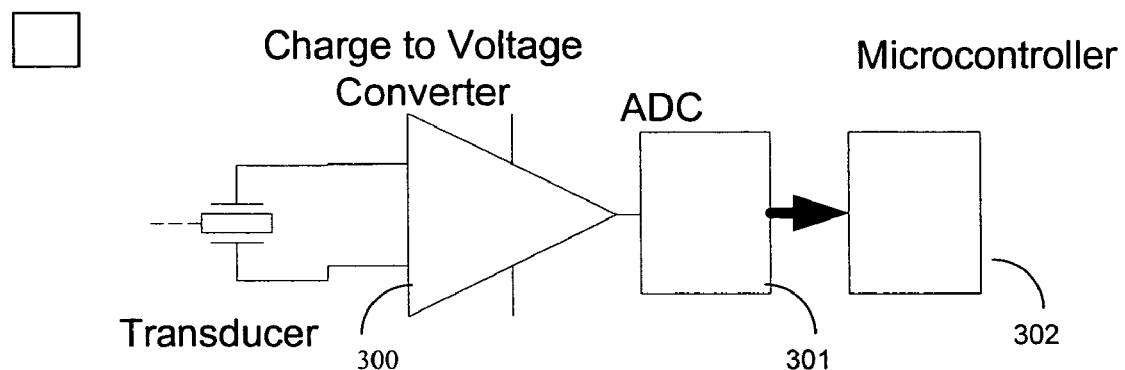
FIG. 20 is a block diagram of a "Trigger by Force" system for starting a welding cycle.

Rather than measure the ultrasonic power, it is possible to utilize the duality of a ceramic piezo transducer. By simply monitoring the output of a transducer (while ultrasonic power is off) it is possible to use this signal to "Trigger by Force" (see FIGS. 17 and 19). The transducer's output signal is proportional to the direct force applied. Post processing circuitry includes a charge-to-voltage amplifier 300, which is connected to an ADC 301. The ADC output is processed by a microcontroller 302 (see FIG. 20).

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An ultrasonic generator for an ultrasonic welding system comprising:
   a chassis having an AC power line input and containing a motherboard assembly that includes fixed connectors for directly connecting the motherboard to the following modules without the use of wire harnesses:
   an input module for rectifying and filtering the AC power from said power line input to DC power,
   an output module for converting said DC power to AC power having an ultrasonic frequency,
   a matching module for matching the impedance of said AC power having an ultrasonic frequency to efficiently transfer that AC power to an ultrasonic transducer that delivers the ultrasonic frequency energy to a load, and
   multiple option modules,
   said motherboard assembly including a digital controller adapted to control and or monitor all said modules.

2. The ultrasonic generator of claim 1 which further comprises direct inter-module connections from said motherboard assembly to all said modules, and said digital controller is adapted to send control signals to said modules, monitor operational status and read identification information stored in each of said modules via said inter-module connections.

3. The ultrasonic generator of claim 2 in which said modules store identification information, and said digital controller automatically recognizes the modules that are installed by reading said identification information stored in each module and automatically adjusts ultrasonic generator system setup parameters to operate correctly with the installed modules.

4. The ultrasonic generator of claim 2 which further comprises an option module card cage so that option cards that are directly connected to the motherboard digital controller can be easily exchanged without opening said chassis.

5. The ultrasonic generator of claim 1 which further comprises
   a control power supply circuit, and
   a power fault detection circuit that monitors the voltage levels of said AC power line input, said rectified and filtered power, and said control power supply circuit, and disables the ultrasonic generator if any of the monitored voltage levels are outside of prescribed operational limits.

6. The ultrasonic generator of claim 1 which further comprises
   a multiple-mode power fault status indicator, and
   a power fault indicator control circuit that activates said multiple-mode power fault status indicator to enable a user or service personnel to easily determine the source of a power fault condition.

7. The ultrasonic generator of claim 1 in which said digital controller is adapted to (a) shut off the ultrasonic generator when the generator output power level exceeds a predetermined average overload power limit for a predetermined time delay interval, and (b) provide a power-versus-time-delay characteristic for said generator output average overload limit, which allows the generator output power level to exceed the average overload power limit for a well characterized and repeatable, brief amount of time, before the ultrasonic generator power output is shut off.

8. The ultrasonic generator of claim 1 in which said digital controller is adapted to prevent an average overload condition from shutting off the ultrasonic generator by rapidly adjusting the amplitude of the generator ultrasonic output to a lower level, as needed, to prevent the generator output power level from exceeding a predetermined rated average overload power level, thus eliminating undesired overload faults that will result in rejected bad parts.

9. The ultrasonic generator of claim 1 in which said digital controller is adapted to gradually ramp the regulated output of the generator from its normal regulation set point to zero, within a user-programmed time period that begins when the generator ultrasound output is switched off, which reduces the ultrasound shut-off stress that is experienced by the components in the ultrasonic welding stack.

10. The ultrasonic generator of claim 1 in which said ultrasonic frequency is controllable, and in which said digital controller is adapted to monitor and store information relating to the actual operating ultrasonic frequency during operation, and to start a new ultrasonic operating cycle at a starting ultrasonic frequency based on the ultrasonic frequency information stored for the previous operating cycle.

11. The ultrasonic generator of claim 1 in which said digital controller is adapted to capture, lock and track the frequency of said ultrasonic power for a predetermined time interval following the beginning of an ultrasound activation cycle, and to then switch off the frequency locking and tracking function and maintain the frequency of said ultrasonic power constant at a predetermined frequency for the remainder of the operating cycle, even if the ultrasonic horn resonates at an improper frequency caused by mechanically coupling to a dense load.

12. The ultrasonic generator of claim 1 in which said digital controller is adapted to allow the selection of an ultrasonic generator output regulation method based on either regulation of the amplitude of the ultrasonic output, or regulation of the power level of the ultrasonic output.

13. The ultrasonic generator of claim 12 in which said digital controller stores multiple selections for the ultrasonic generator regulation response time characteristic ranging from fast to slow regulation response times, and is adapted to permit user selection of one of said stored multiple selections.

14. The ultrasonic generator of claim 12 in which said digital controller stores a plurality of selectable operating ranges to scale the response to a remote control input signal that commands an output regulation setpoint of the ultrasonic generator, and is adapted to respond to said remote control input signal by selecting one of said stored operating ranges that is optimum for the particular generator model being used.

15. The ultrasonic generator of claim 1 in which said digital controller is adapted to control a probe actuator device in the welding process, to begin the welding process by applying a low level of adjustable ultrasound output to the parts being joined, to monitor the power level as the force applied to the parts increases, and to start the welding process when a user-programmed trigger power level is detected, without the need for a load cell or force transducer to directly measure the applied force.

* * * * *